United States Patent
Okamoto

(10) Patent No.: US 8,111,940 B2
(45) Date of Patent: Feb. 7, 2012

(54) IMAGE CORRECTION APPARATUS AND METHOD, AND IMAGE CORRECTION PROGRAM

(75) Inventor: Takahiro Okamoto, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 1032 days.

(21) Appl. No.: 11/664,117

(22) PCT Filed: Sep. 30, 2005

(86) PCT No.: PCT/JP2005/018576
§ 371 (c)(1),
(2), (4) Date: Mar. 30, 2007

(87) PCT Pub. No.: WO2006/036026
PCT Pub. Date: Apr. 6, 2006

(65) Prior Publication Data
US 2007/0280538 A1   Dec. 6, 2007

(30) Foreign Application Priority Data
Sep. 30, 2004   (JP) ................................. 2004-285682

(51) Int. Cl.
G06K 9/00 (2006.01)
G06K 9/34 (2006.01)
G06K 9/46 (2006.01)
G06K 9/66 (2006.01)
G06K 9/62 (2006.01)
G06K 9/40 (2006.01)
G06K 9/36 (2006.01)
H04N 5/228 (2006.01)
H04N 5/238 (2006.01)
H04N 9/68 (2006.01)
H04N 5/52 (2006.01)
H04N 5/57 (2006.01)

(52) U.S. Cl. ........ 382/274; 382/167; 382/170; 382/173; 382/181; 382/190; 382/195; 382/224; 382/254; 382/276; 348/222.1; 348/364; 348/645; 348/678; 348/687

(58) Field of Classification Search .................. 382/162, 382/167, 170–171, 173, 181, 190, 195, 225, 382/254, 274–276, 282–283, 286; 348/222.1, 348/364, 645, 678, 687
See application file for complete search history.

(56) References Cited

U.S. PATENT DOCUMENTS
5,940,530 A   8/1999   Fukushima et al.
(Continued)

FOREIGN PATENT DOCUMENTS
EP   1 802 096 A1   6/2007
(Continued)

OTHER PUBLICATIONS

EP Communication, dated May 15, 2009, issued in corresponding EP Application No. 05790447.6, 3 pages.
(Continued)

Primary Examiner — Anand Bhatnagar
Assistant Examiner — Nathan Bloom
(74) Attorney, Agent, or Firm — Sughrue Mion, PLLC

(57) ABSTRACT

Which types of subject among a predetermined plurality of types of subject are contained in an image represented by input image data are detected. Features regarding the detected subject types are calculated in a feature calculating circuit based upon the image data. In accordance with the features calculated, the gain for every subject type is calculated. The gains are weighted and averaged using degrees of importance that have been input for every subject type. The input image data is corrected based upon applicable gains obtained by the weighted averaging.

11 Claims, 18 Drawing Sheets

U.S. PATENT DOCUMENTS

| | | | |
|---|---|---|---|
| 6,256,104 B1* | 7/2001 | Rumph et al. | 358/1.15 |
| 7,218,419 B2* | 5/2007 | Tomomatsu | 358/3.14 |
| 7,423,674 B2* | 9/2008 | Takeshita | 348/223.1 |
| 2002/0036697 A1* | 3/2002 | Mori et al. | 348/229 |
| 2002/0085740 A1* | 7/2002 | Asano et al. | 382/107 |
| 2002/0131635 A1 | 9/2002 | Cooper | |
| 2002/0181801 A1* | 12/2002 | Needham et al. | 382/274 |
| 2003/0053689 A1 | 3/2003 | Watanabe et al. | |
| 2003/0081255 A1* | 5/2003 | Shimizu | 358/2.1 |
| 2003/0108250 A1* | 6/2003 | Luo et al. | 382/263 |
| 2003/0123751 A1* | 7/2003 | Krishnamurthy et al. | 382/282 |
| 2004/0151376 A1 | 8/2004 | Nomura et al. | |
| 2005/0185055 A1* | 8/2005 | Miller et al. | 348/207.1 |
| 2006/0181618 A1* | 8/2006 | Kameyama | 348/234 |
| 2006/0215924 A1* | 9/2006 | Steinberg et al. | 382/254 |
| 2007/0263095 A1* | 11/2007 | Shinkai | 348/207.99 |
| 2007/0292038 A1* | 12/2007 | Takemoto | 382/240 |
| 2009/0179998 A1* | 7/2009 | Steinberg et al. | 348/222.1 |

FOREIGN PATENT DOCUMENTS

JP       2001-076149 A       3/2001

OTHER PUBLICATIONS

JP Notification of Reasons for Refusal, dated Aug. 25, 2009, issued in corresponding JP Application No. 2006-537860, 4 pages in English and Japanese.

* cited by examiner

*Fig. 5*

DETECTION CONDITION TABLE 21

| SUBJECT TYPE | PIXEL EXTRACTION CONDITION | DETECTION CONDITION |
|---|---|---|
| BLUE SKY | BLUE-SKY PIXEL EXTRACTION.dat | BLUE-SKY AREA RATIO Asky ≧ 0.01 |
| SUNSET SCENE | SUNSET-SCENE PIXEL EXTRACTION.dat | SUNSET-SCENE AREA RATIO Asky ≧ 0.03 |
| FACE | FACE PIXEL EXTRACTION.dat | CIRCULARITY ≧ 0.13 |
| ...... | ...... | ...... |
| NIGHT SCENE | NIGHT-SCENE PIXEL EXTRACTION.dat | NIGHT-SCENE AREA RATIO Anight ≧ 0.1 |

*Fig. 7*

FEATURE VALUE CALCULATION TABLE 22

| SUBJECT TYPE | FEATURE-VALUE CALCULATION CONDITION |
|---|---|
| BLUE SKY | AVERAGE VALUE OF EACH OF COLORS R, G, B OF BLUE-SKY PIXELS |
| SUNSET SCENE | AVERAGE VALUE OF EACH OF COLORS R, G, B OF SUNSET-SCENE PIXELS |
| FACE | AVERAGE VALUE OF EACH OF COLORS R, G, B OF FACE PIXELS |
| ...... | ...... |
| NIGHT SCENE | R, G, B VALUES CORRESPONDING TO 90% POINT OF LUMINANCE HISTOGRAM |
| | R, G, B VALUES CORRESPONDING TO 10% POINT OF LUMINANCE HISTOGRAM |

*Fig. 12*

○ PRINT - EMPHASIZE PRODUCTIVITY

● PRINT - EMPHASIZE QUALITY

○ PHOTOGRAPH - EMPHASIZE PRODUCTIVITY

○ PHOTOGRAPH - EMPHASIZE QUALITY

Fig. 16

| SUBJECT TYPE | TYPE OF FEATURE-VALUE TO BE USED IN CALCULATION OF EXISTENCE PROBABILITY | IDENTIFICATION POINTS |
|---|---|---|
| BLUE SKY | B-VALUE 90% VALUE | −1.8, −1.6, ....., 3.2, 3.0 |
| | Y-VALUE 70% VALUE | −2.1, −1.9, ....., 2.3, 2.1 |
| | B-VALUE 70% VALUE | −1.5, −1.3, ....., 1.6, 1.4 |
| SUNSET SCENE | R-VALUE 70% VALUE | −2.5, −3.2, ....., 3.1, 3.0 |
| | Y-VALUE 90% VALUE | −2.0, −2.5, ....., 2.8, 3.0 |
| | R-VALUE 90% VALUE | −1.8, −1.8, ....., 2.0, 1.9 |
| | Cr-VALUE AVERAGE | −1.5, −1.3, ....., 1.5, 1.6 |
| ...... | ...... | ...... |
| UNDERWATER | B-VALUE AVERAGE | −2.1, −2.2, ....., 2.5, 2.2 |
| | B VALUE (80% POINT) − B VALUE (20% POINT) | 2.5, 2.3, ....., −2.0, −2.3 |
| | Cb VALUE 70% POINT | −1.8, −1.9, ....., −2.0, −2.3 |
| ...... | ...... | ...... |

21

IMAGE CORRECTION APPARATUS AND METHOD, AND IMAGE CORRECTION PROGRAM

TECHNICAL FIELD

This invention relates to an image correction apparatus and method and to an image correction program.

BACKGROUND ART

Japanese Patent Application Laid-Open No. 2000-196890 discloses a method of detecting a face image area contained in an input image and performing an image conversion (image correction) in such a manner that the average density of the detected face image will fall within a predetermined target density range.

Although the density of the face image area can be corrected to a density within the target density range using the method described in Japanese Patent Application Laid-Open No. 2000-196890, the densities of other types of important subjects, such as blue sky or a sunset scene, cannot be corrected to a desired density.

DISCLOSURE OF THE INVENTION

Accordingly, an object of the present invention is to so arrange it that an appropriate image correction can be applied with regard to an image in which a plurality of subject types exist.

Another object of the present invention is to apply a correction to an image in which a plurality of subject types exist in such a manner that a desired image color (brightness) is obtained for the image as a whole.

An image correction apparatus according to a first aspect of the present invention comprises: importance input means for accepting inputs of degrees of importance regarding respective ones of a plurality of subject types; subject-type detecting means for detecting, based upon image data applied thereto, which subject types among a predetermined plurality of subject types are contained in the image represented by this image data; input feature value calculating means for calculating, based upon the image data and with regard to respective ones of the subject types detected by the subject-type detecting means, input feature values by calculation processing decided for every subject type; correction value calculating means for calculating correction values regarding respective ones of the subject types based upon the input feature values calculated by the input feature value calculating means and target feature values that has been decided for every subject type; applicable-correction-value calculating means for calculating an applicable correction value obtained by weighted averaging of the correction values, which have been calculated by the correction value calculating means, using the degrees of importance accepted with regard to respective ones of the subject types by the importance input means; and image correcting means for correcting the image data based upon the applicable correction value calculated by the applicable-correction-value calculating means.

A plurality of subject types to be detected are determined in advance. Set as the subject types are a plurality of types of subjects (which may also be referred to as types of photographic scenes) identifiable based upon the image data, these types of subject being set in order to undergo different corrections in image correction (it is known from experience that executing different correction processing results in a corrected image that is appropriate). For example, "blue sky", "human face", "underwater", "high saturation", "sunset scene" and "high key" can be set as the plurality of subject types.

Processing (subject-type detection processing) for detecting which of predetermined subject types are contained in an image represented by applied image data can be executed using data for identification set in advance with regard to respective ones of the subject types. For example, a plurality of items of image data (blue-sky sample images) representing the subject type "blue sky" are prepared and an appropriate identification condition [feature type and range thereof (hue range, luminance range, saturation range, etc.)] is calculated in order to extract blue-sky pixels from each of these samples images (this is learning processing). One or a plurality of feature values are extracted from the applied image data. If the extracted one or plurality of feature values are in line with the identification condition obtained from learning processing, then it is judged that the image represented by the applied image data contains the subject type "blue sky".

Input feature values that have been decided on a per-subject-type basis are calculated based upon the image data in regard to respective ones of the feature types detected. The input feature values are feature values (quantities) specific to the subject types with regard to respective ones of the subject types, and processing for calculating these differs for every subject type. For example, if the subject type is "blue sky", average values of respective ones of R, G, B values of pixels (blue-sky pixels) of a blue-sky image portion contained in the image represented by the applied image data can be adopted as input feature values regarding the subject type "blue sky". If the subject type is "sunset scene", then average values of respective ones of R, G, B values of pixels [sunset-scene (orange) pixels] of a sunset-scene image portion contained in the image represented by the applied image data can be adopted as input feature values regarding the subject type "sunset scene". In any case, the method of calculating the input feature value(s) need only be decided for every subject type in accordance with the features of an image represented by a predetermined plurality of subject types.

A correction value is a value for correcting an input feature value to a target feature value. By correcting an input feature value, which is obtained from the applied image data, to a target feature value, an image having the desired (target) feature can be obtained. If an input feature value is corrected in accordance with a correction value, the input feature value becomes the target feature value. Correction values that may be calculated include various correction values that can be used in image correction, e.g., a density (luminance) grayscale correction value, saturation correction value and other correction values. The ratio (gain) between an input feature value and a target feature value also is included in correction values found according to the present invention.

In accordance with the present invention, applicable correction value applied to image data are the result of weighted averaging, based upon degrees of importance of every subject type, the correction values obtained with regard to respective ones of the detected subject types (i.e., subject types contained in the image represented by the image data to be processed). The correction value obtained for every subject type corrects the input feature value, which is based upon the applied image data, to a target feature value. Since the plurality of correction values calculated with regard to respective ones of the detected plurality of subject types are weighted and averaged with regard to the degrees of importance received, the applicable correction value applied to the image data are such that input feature values of the respective plurality of subject types approach overall the target feature values corresponding to the input feature values. The color (or brightness) of the applied image can be corrected to a desired image color (or brightness) in terms of the overall image.

In accordance with the present invention, an input feature value cannot be made to perfectly coincide with a target feature value when attention is directed toward each individual feature type. However, with regard to an image in which a plurality of subject types are contained, an image correction whereby the input feature values approach the target feature values reliably can be executed with regard to any of the plurality of subject types.

Further, in accordance with the present invention, degrees of importance applied with regard to respective subject types are used in the calculation of weighted average. It is possible to obtain an applicable correction value that greatly reflects a correction value regarding a subject type that the user regards as important. As a result, an applicable correction value for implementing an image correction conforming to user preference can be obtained.

Correction values and applicable correction value may be specific to respective ones of color image data (e.g., RGB) of a plurality of colors or may be shared by respective ones of color image data of a plurality of colors.

In one embodiment, the apparatus further comprises subject type-by-type existence-probability calculating means for calculating existence probabilities representing to what degrees of confidence respective ones of images representing the plurality of subject types are contained in the image represented by the image data, the calculation being performed for every subject type of the plurality thereof. In this case, applicable-correction-value calculating means weights and averages the correction values regarding respective ones of the subject types, which have been calculated by the correction value calculating means, using the first degrees of importance and second degrees of importance obtained in accordance with the existence probabilities of respective ones of the subject types calculated by the existence-probability calculating means.

The second degree of importance conforming to existence probability is used in weighted averaging in addition to the first degree of importance that is input. An image correction conforming to the content of the applied image data (probability of existence a subject type) is therefore achieved while user preference is satisfied.

In another embodiment, the apparatus further comprises subject type-by-type area calculating means for calculating, for every detected subject type, the area that an image representing the subject type occupies in the image represented by the image data. The applicable-correction-value calculating means weights and averages the correction values of respective ones of the subject types, which have been calculated by the correction value calculating means, using the first degrees of importance and third degrees of importance obtained in accordance with the areas regarding respective ones of the subject types calculated by the area calculating means. An image correction conforming to the area of a subject type that occupies the image represented by the applied image data is therefore achieved while user preference is satisfied.

Preferably, the image correction apparatus further comprises parameter input means for accepting input of a parameter that changes the target feature value; and target feature modifying means for modifying the target feature value based upon the parameter input by the parameter input means. Since a target feature value is modified in accordance with the wish of the user, the image represented by the image data after the correction thereof can be made to conform to user preference. The parameter that is input may be accepted in the form of a numerical value or in the form of an abstract expression (which emphasizes quality or productivity, etc.).

An image correction apparatus according to a second aspect of the present invention comprises: importance input means for accepting inputs of degrees of importance regarding respective ones of a predetermined plurality of subject types; subject-type detecting means for detecting, based upon image data applied thereto, which subject types among a plurality of subject types are contained in the image represented by this image data; input feature value calculating means for calculating, based upon the image data and with regard to respective ones of the subject types detected by the subject-type detecting means, input feature values by calculation processing decided for every subject type; condition judging means for judging whether the input feature value of every subject type calculated by the input feature calculating means satisfies a prescribed condition that has been decided for every subject type; correction value calculating means for calculating a correction value with regard to a subject type for which the input feature value has been judged not to satisfy the prescribed condition by the condition judging means, the correction value being such that the input feature regarding this subject type will come to satisfy the prescribed condition; applicable-correction-value calculating means for calculating applicable correction value obtained by weighted averaging of the correction values, which have been calculated by the correction value calculating means, using the degrees of importance accepted with regard to respective ones of the subject types by the importance input means; and image correcting means for correcting the image data based upon the applicable correction value calculated by the applicable-correction-value calculating means.

In accordance with the second aspect of the present invention, a correction value is calculated based upon whether or not an input feature value for every detected subject type satisfies a prescribed condition. In a case where an input feature value regarding one detected subject type satisfies the prescribed condition, it is not necessary to correct the input feature value regarding this one subject type. If an input feature value regarding one detected subject type does not satisfy the prescribed condition, then a correction value for which the prescribed condition will be satisfied is calculated with regard to this one subject type. The prescribed conditions also can be decided by learning processing executed in advance.

In the second aspect of the present invention as well, a calculated plurality of correction values are weighted and averaged based upon accepted degrees of importance, and therefore the applicable correction value applied to the image data corrects the image data in such a manner that, with regard to subject types for which input feature values that do not satisfy prescribed conditions have been calculated, these input feature values will come to approach the prescribed conditions. An image correction conforming to user preference is achieved. The color (or brightness) of the applied image can be corrected to a desired image color (or brightness) in terms of the overall image.

Preferably, the image correction apparatus further comprises parameter input means for accepting input of a parameter that changes the prescribed condition; and condition modifying means for modifying the prescribed condition based upon the parameter input by the parameter input means.

The present invention also provides image correction methods and image correction programs corresponding to the first and second image correction apparatuses described above.

BRIEF DESCRIPTION OF THE DRAWINGS

FIG. 5 illustrates the content of a detection condition table;

FIG. 7 illustrates the content of a table of feature value calculation conditions;

FIG. 12 illustrates an example of a screen for inputting a user's wish;

FIG. 16 illustrates the content of an existence-probability calculation table;

BEST MODE FOR CARRYING OUT THE INVENTION

First Embodiment

Figure 1:
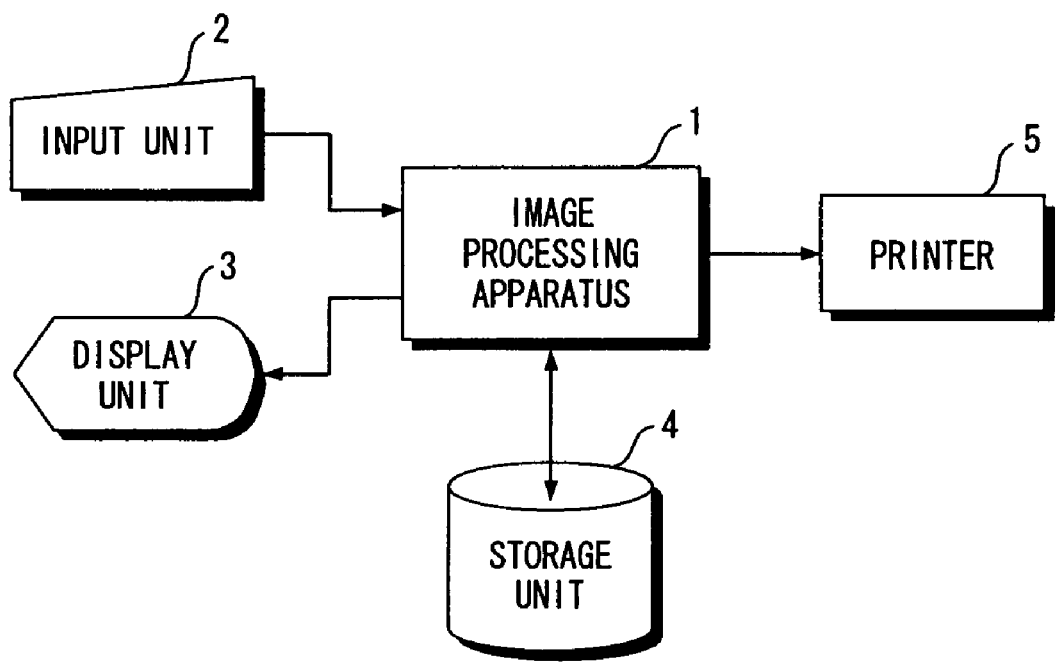
FIG. 1 is a block diagram illustrating the hardware configuration of an image correction system.
Figure 2:
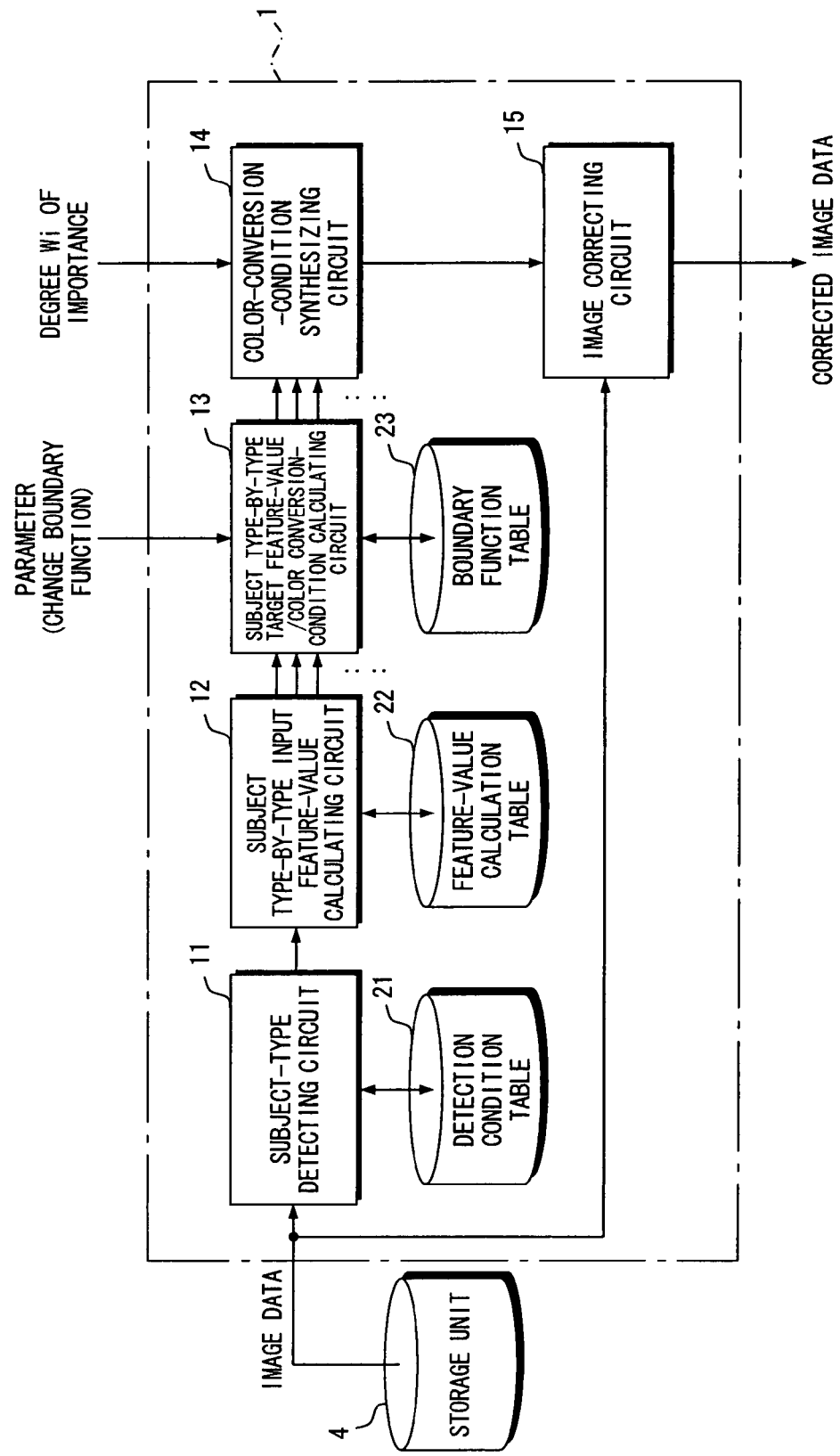
FIG. 2 is a block diagram illustrating the electrical structure of an image correction apparatus according to a first embodiment.

FIG. 1 is a block diagram illustrating the hardware configuration of an image processing system. FIG. 2 is a block diagram illustrating the electrical structure of an image processing apparatus 1, which is included in the image processing system, together with a storage unit 4.

The image processing system comprises the image processing apparatus 1, an input unit 2 (keyboard, mouse, etc.) connected to the image processing apparatus 1, a display unit 3 (CRT display, liquid crystal display, etc.), the storage unit 4 (hard disk, etc.) and a printer 5.

Image data has been stored in the storage unit 4 connected to the image processing apparatus 1. Image data that has been specified by the input unit 2 is read out of the storage unit 4 and is input to the image processing apparatus 1 via an input interface (not shown) (Image data that is input to the image processing apparatus 1 shall be referred to as "input image data" below, and an image represented by input image data shall be referred to as an "input image" below.) It may of course be so arranged that image data that has been recorded on a CD-ROM, DVD-ROM, memory card or other recording medium instead of the storage unit 4 is input to the image processing apparatus 1. In this case, a CD-ROM drive or DVD-ROM drive, etc., is connected to the image processing apparatus 1 of the image processing system. It may be so arranged that image data that has been transmitted through a network is input to the image processing apparatus 1. In this case, a transceiver (modem, etc.) for sending and receiving image data over a network is connected to the image processing apparatus 1.

The image processing apparatus 1 has a subject-type detecting circuit 11, a subject type-by-type input feature-value calculating circuit 12, a subject type-by-type target feature-value/color-conversion-condition calculating circuit 13, a color-conversion-condition synthesizing circuit 14 and an image correcting circuit 15.

The subject-type detecting circuit 11 is a circuit for detecting (identifying) subject types contained in an input image represented by input image data. Input image data that has been input to the image processing apparatus 1 is applied first to the subject-type detecting circuit 11. In the first embodiment, the subject-type detecting circuit 11 detects whether each of the seven subject types "blue sky", "sunset scene", "face", "high saturation", "underwater", "high key" and "night scene" is contained in the input image. A detection condition table 21 is connected to the subject-type detecting circuit 11. On the basis of data that has been stored in the detection condition table 21, which subject types are contained in the input image are detected in the subject-type detecting circuit 11. The processing by the subject-type detecting circuit 11 and the content of the detection condition table 21 will be described in detail later.

The subject type-by-type input feature-value calculating circuit 12 is a circuit for calculating prescribed feature value (e.g., average RGB values, RGB dispersion values, etc.) specific to respective subject types regarding an input image represented by input image data. Feature value calculated in the subject type-by-type input feature-value calculating circuit 12 using the input image data shall be referred to as "input feature value" below. A feature-value calculation table 22 is connected to the subject type-by-type input feature-value calculating circuit 12. The subject type-by-type input feature-value calculating circuit 12 calculates an input feature value specific to every feature type by referring to the feature-value calculation table 22. Processing by the subject type-by-type input feature-value calculating circuit 12 and the content of the feature-value calculation table 22 will be described in detail later.

The subject type-by-type target feature-value/color-conversion-condition calculating circuit 13 is a circuit for calculating a target feature value (e.g., RGB value) for every subject type. A target feature value varies depending upon the input feature value calculated in the subject type-by-type input feature-value calculating circuit 12 and a parameter (referred to as an "input parameter" below) that is input by the operator (user) of the image processing system using the input unit 2.

By calculating (deciding) a target feature value, the ratio between the target feature value (e.g., RGB value) and an input feature value (e.g., RGB value) is adopted as the gain of the subject type (gain coefficients regarding respective R, B, G components are obtained). The subject type-by-type target feature-value/color-conversion-condition calculating circuit 13 can be referred to as a circuit that calculates (decides) a target feature value corresponding to the input feature value, thereby calculating gains regarding respective subject types detected by the subject-type detecting circuit 11.

A boundary function table 23 in which data representing boundary functions decided for each of the subject types has been stored is connected to the subject type-by-type target feature-value/color-conversion-condition calculating circuit 13. Target feature values (gains) are calculated (decided) based upon the boundary function table 23. Processing by the subject type-by-type target feature-value/color-conversion-condition calculating circuit 13 and the content of the boundary function table 23 will be described in detail later.

The color-conversion-condition synthesizing circuit 14 is a circuit for calculating one gain (for each of R, G, B) based upon gains (gain coefficients regarding respective R, G, B components), which have been obtained in the subject type-by-type target feature-value/color-conversion-condition calculating circuit 13, regarding each of the subject types that have been detected, and a degree Wi of importance, which is input by the operator (user) of the image processing system using the input unit 2, regarding each of the subject types. The details of processing by the color-conversion-condition synthesizing circuit 14 will be described later.

The image correcting circuit 15 is a circuit for correcting (converting) the RGB values of each of the pixels constituting the input image based on gain (applicable gain coefficients) calculated by the color-conversion-condition synthesizing circuit 14.

Figure 3:
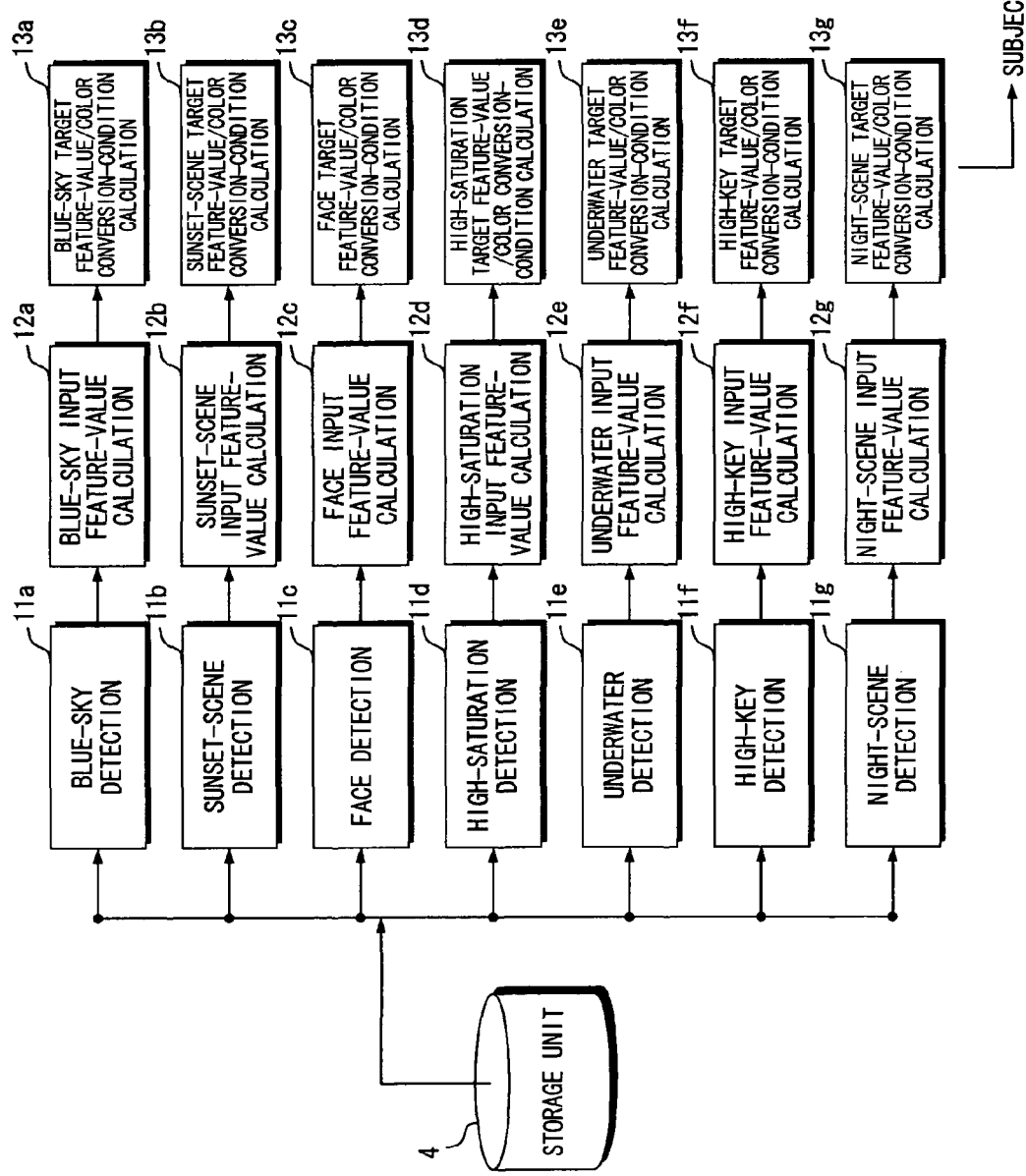
FIG. 3 is a functional block diagram illustrating the functions of a subject-type detecting circuit, a subject type-by-type input feature-value calculating circuit and a subject type-by-type target feature-value/color-conversion-condition calculating circuit.

FIG. 3 is a functional block diagram illustrating the functions of the subject-type detecting circuit 11, the subject type-by-type input feature-value calculating circuit 12 and the subject type-by-type target feature-value/color-conversion-condition calculating circuit 13.

In the first embodiment, "subject type" is a generic term that refers to seven types of subjects (photographic scenes), namely "blue sky", "sunset scene", "face", "high saturation", "underwater", "high key" and "night scene", as mentioned above. On the basis of image data to be processed read out of the storage unit 4, whether the image represented by this image data contains these seven types of subjects is detected in the subject-type detecting circuit 11 (function blocks 11a to 11g).

The subject type-by-type input feature-value calculating circuit 12 is adapted so as to be able to calculate input feature values regarding respective ones of the seven subject types "blue sky", "sunset scene", "face", "high saturation", "underwater", "high key" and "night scene" (function blocks 12a to 12g). Which values are used as input feature values differ on a per-subject-type basis. Definitions as to which values are used as input feature values have been stored in the feature-value calculation table 22 (described later).

The target feature values (gains) corresponding to the input feature values of every subject type calculated in the subject type-by-type input feature-value calculating circuit 12 are calculated (decided) in the subject type-by-type target feature-value/color-conversion-condition calculating circuit 13 (function blocks 13a to 13g).

Gains (Gri, Ggi, Gbi) calculated for every detected subject type are supplied from the subject type-by-type target feature-value/color-conversion-condition calculating circuit 13 to the color-conversion-condition synthesizing circuit 14 (see FIG. 2), whereby a single gain (applicable gain) is calculated.

The processing (processing by function blocks 11a, 12a and 13a) executed by the subject-type detecting circuit 11, subject type-by-type input feature-value calculating circuit 12 and subject type-by-type target feature-value/color-conversion-condition calculating circuit 13 will now be described with attention being directed to the subject type "blue sky", which is one of the subject types capable of being detected by the image processing apparatus 1 of the first embodiment.

Figure 4:
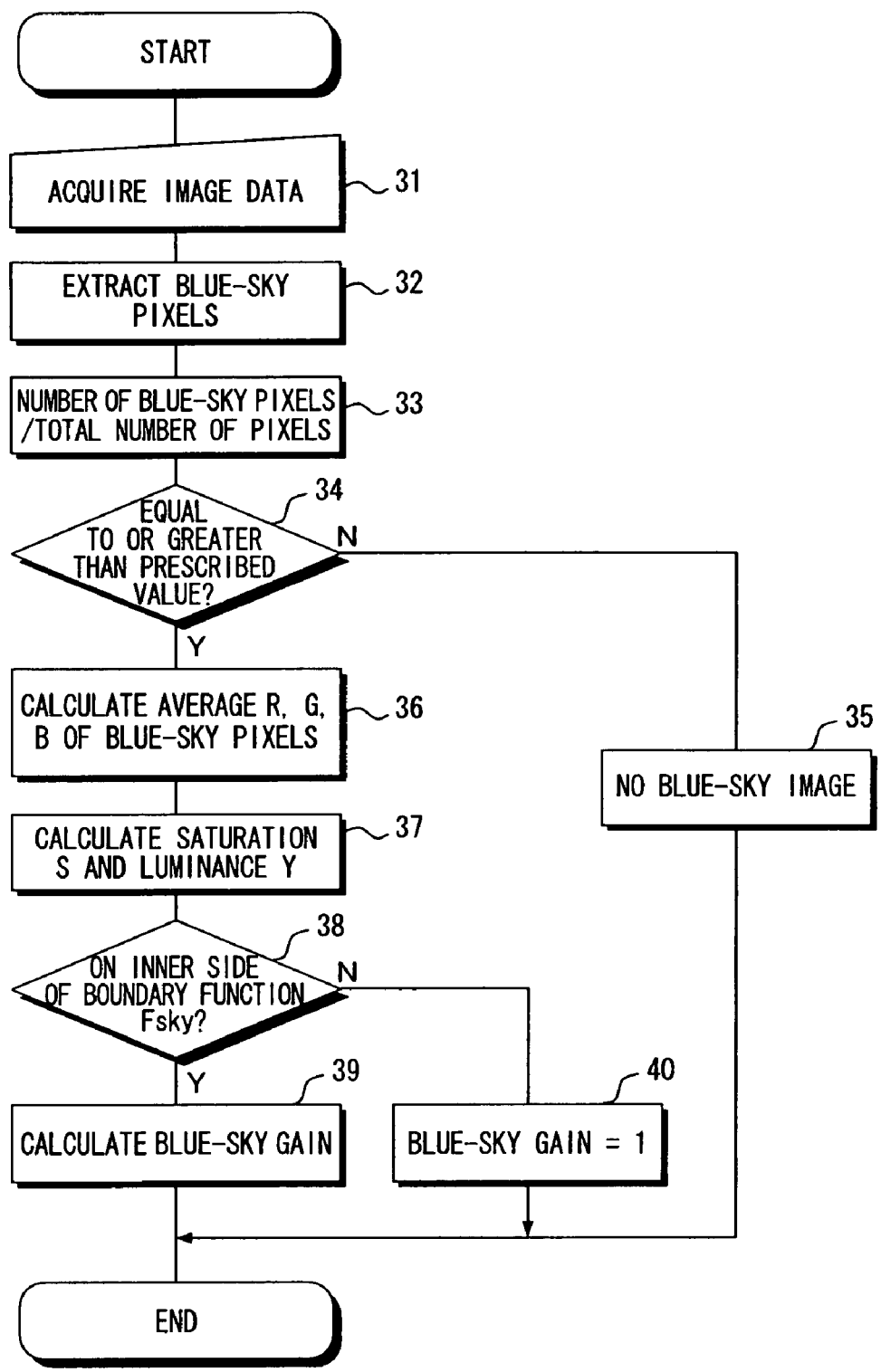
FIG. 4 is a flowchart illustrating the flow of processing executed by the subject-type detecting circuit, subject type-by-type input feature-value calculating circuit and subject type-by-type target feature-value/color-conversion-condition calculating circuit with regard to the subject type "blue sky"

FIG. 4 is a flowchart illustrating the flow of processing executed by the subject-type detecting circuit 11, subject type-by-type input feature-value calculating circuit 12 and subject type-by-type target feature-value/color-conversion-condition calculating circuit 13 with regard to the subject type "blue sky" (function blocks 11a, 12a and 13a).

Image data (input image data) to be processed is read out of the storage unit 4. The input image data read out is applied to the subject-type detecting circuit 11 (step 31).

The subject-type detecting circuit 11 refers to the detection condition table 21. FIG. 5 illustrates the content of the detection condition table 21.

Data representing pixel extraction conditions and data representing detection conditions regarding respective ones of subject types have been stored in the detection condition table 21. A set composed of a pixel extraction condition and a detection condition regarding the subject type "blue sky" is used in a blue-sky detecting function 11a.

Pixel extraction conditions that have been stored in the detection condition table 21 decide conditions for extracting pixels representing respective ones of the subject types from among the pixels constituting the input image.

Data (a blue-sky pixel extraction condition) representing the pixel extraction condition that has been decided with regard to the subject type "blue sky" will now be described.

In the first embodiment, a blue-sky pixel is assumed to be a pixel that satisfies the following equation among the pixels constituting the input image:

$$308° \leq H \leq 351°$$

$$S \geq 0.25 Smax$$

$$Y \geq 0.25 Ymax$$

$$Ymax \cdot S \geq (Ymax - Y) \cdot Smax \qquad \text{Equation 1}$$

Here H, S and Y represent hue, saturation and luminance, respectively. Luminance Y is calculated based upon RGB values of each pixel according to the following equation;

$$Y = (19R + 38G + 7B)/64 \qquad \text{Equation 2}$$

Further, saturation S is calculated based upon the RGB values of each pixel according to the following equation:

$$S = SQRT(Cr^2 + Cb^2) \qquad \text{Equation 3}$$

Here Cr, Cb in Equation 3 are calculated according to the following equations:

$$Cr = R - Y$$

$$Cb = B - Y \qquad \text{Equation 4}$$

Further, Ymax and Smax in Equation 1 represent maximum luminance and maximum saturation, respectively, in the overall input image.

Figure 6:
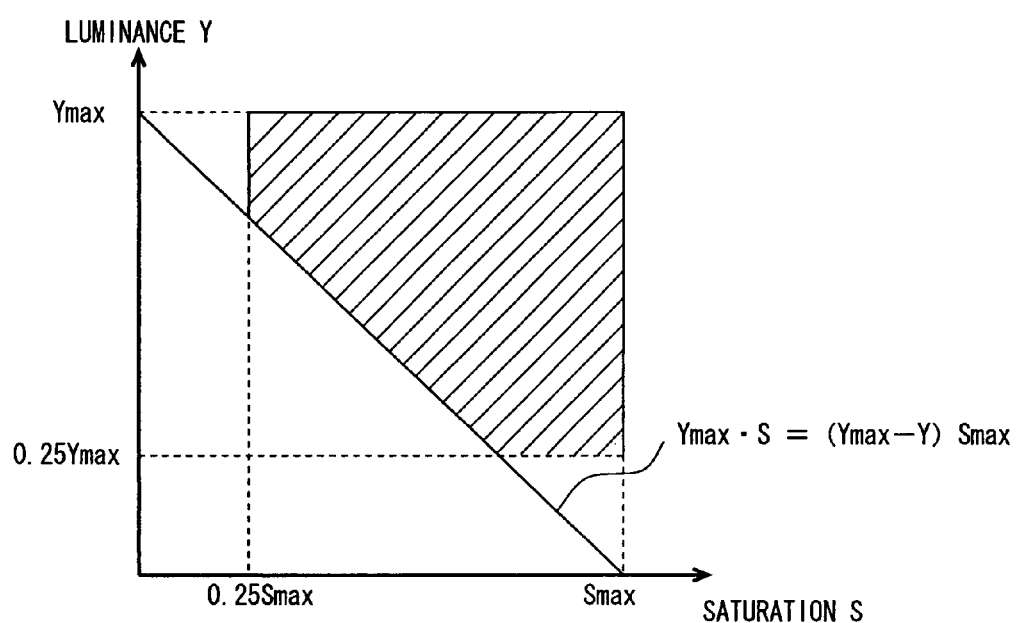
FIG. 6 illustrates a blue-sky extraction condition in the form of a graph.

FIG. 6 illustrates a blue-sky pixel extraction condition (blue-sky pixel extraction condition .dat) (Equation 1 cited above) in the form of a graph in which luminance Y and saturation S are plotted along the vertical and horizontal axes, respectively. Pixels that belong to a zone decided by Equation 1, namely pixels that belong to the zone indicated by the hatching in FIG. 6, are extracted pixels (referred to as a "blue sky pixels" below) regarding the subject type "blue sky", this pixels being among the pixels constituting the input image. On the basis of the blue-sky pixel extraction condition that has been stored in the detection condition table 21, blue-sky pixels are extracted from among the pixels constituting the input image (step 32).

The number of blue-sky pixels that have been extracted based upon the blue-sky pixel extraction condition in the detection condition table 21 is calculated and the ratio of the calculated number of blue-sky pixels to the total number of pixels is calculated (step 33).

It is determined whether the ratio of the calculated number of blue-sky pixels to the total number of pixels, i.e., the proportion (area ratio) of the input image occupied by the blue-sky pixels, is equal to or greater than a prescribed value (step 34). To make this determination, reference is had to the detection condition regarding the subject type "blue sky" stored in the detection condition table 21.

With reference to FIG. 5, the detection condition regarding the subject type "blue sky" is blue-sky area ratio Asky≧0.01. Hence, with regard to the subject type "blue sky", it is determined whether the number of blue-sky pixels (the area ratio) is in line with this condition.

If the blue-sky area ratio Asky is less than the prescribed value (blue-sky area ratio Asky<0.01), then the input image represented by the input image data is handled as not being an image that contains the subject type "blue sky" ("NO" at step 34; step 35). In this case, data indicative of the fact that the input image does not contain a blue-sky image is supplied from the subject-type detecting circuit 11 to the subject type-by-type input feature-value calculating circuit 12 and subject type-by-type target feature-value/color-conversion-condition calculating circuit 13. In this case, the subject type-by-type input feature-value calculating circuit 12 and subject type-by-type target feature-value/color-conversion-condition calculating circuit 13 do not execute processing regarding the subject type "blue sky". That is, a target feature value (gain) regarding the subject type "blue sky" is not calculated.

If the blue-sky area ratio Asky is equal to or greater than the prescribed value (blue-sky area ratio Asky≧0.01) ("YES" at step 34), then the input image is handled as an image containing the subject type "blue sky".

Pixel extraction conditions and detection conditions can be set by learning processing. For example, a plurality of images (blue-sky sample images) for which the subject type is to be judged as being "blue sky" are prepared, and a feature value and range(s) thereof (e.g., hue range, luminance range, saturation range, area ratio, etc.) extracted in common from the plurality of blue-sky sample images are derived. The pixel extraction condition and detection condition are decided based upon the derived feature value and range thereof. Of course, it may be so arranged that the conditions (pixel extraction condition and detection condition) obtained by learning processing may be revised manually.

In the case where the input image is an image containing the subject type "blue sky", the processing set forth below is executed in the subject type-by-type input feature-value calculating circuit 12 and subject type-by-type target feature-value/color-conversion-condition calculating circuit 13.

The input image data is applied to the subject type-by-type input feature-value calculating circuit 12. By referring to the feature-value calculation table 22, the subject type-by-type input feature value calculating circuit 12 calculates the feature value(s) that has been decided with regard to the subject type "blue sky" (this is processing executed by blue-sky input feature value calculating function 12a).

FIG. 7 illustrates the content of the feature-value calculation table 22.

Definitions relating to feature values to be calculated have been stored in the feature calculation table 22 in regard to respective subject types. In accordance with the definitions that have been stored in the feature-value calculation table 22, the subject type-by-type input feature-value calculating circuit 12 calculates the feature values of each of the subject types based upon the input image data.

With reference to FIG. 7, the fact that average values of each of the colors R, G, B of blue-sky pixels are calculated as a feature value calculation condition is defined in the feature-value calculation table 22. The subject type-by-type input feature-value calculating circuit 12 calculates average values (Rave, Gave, Bave) of the respective colors R, G, B regarding blue-sky pixels in the image represented by the input image data (the blue-sky pixels that have been detected in the subject-type detecting circuit 11 are used) (step 36).

The calculated RGB average values (Rave, Gave, Bave) of the blue-sky pixels are applied to the subject type-by-type target feature-value/color-conversion-condition calculating circuit 13 as the input feature value.

The subject type-by-type target feature-value/color-conversion-condition calculating circuit 13 calculates the target feature value (gain) on a per-subject-type basis based upon the input feature value calculated in the subject type-by-type input feature-value calculating circuit 12 and boundary function data decided for every subject type and stored in the boundary function table 23. The processing set forth below is executed.

Saturation S and luminance Y are calculated from the input feature value (Rave, Gave, Bave) regarding the subject type "blue sky" (step 37). Saturation S is calculated based upon Equations 3 and 4 cited above. Luminance Y is calculated based upon Equation 2 cited above.

With regard to the feature type "blue sky", the subject type-by-type target feature-value/color-conversion-condition calculating circuit 13 calculates the target feature value and gain based upon the boundary function data regarding the subject type "blue sky" stored in the boundary function table 23 as well as saturation S and luminance Y calculated from the input feature value (Rave, Gave, Bave) regarding the subject type "blue sky".

Figure 8:
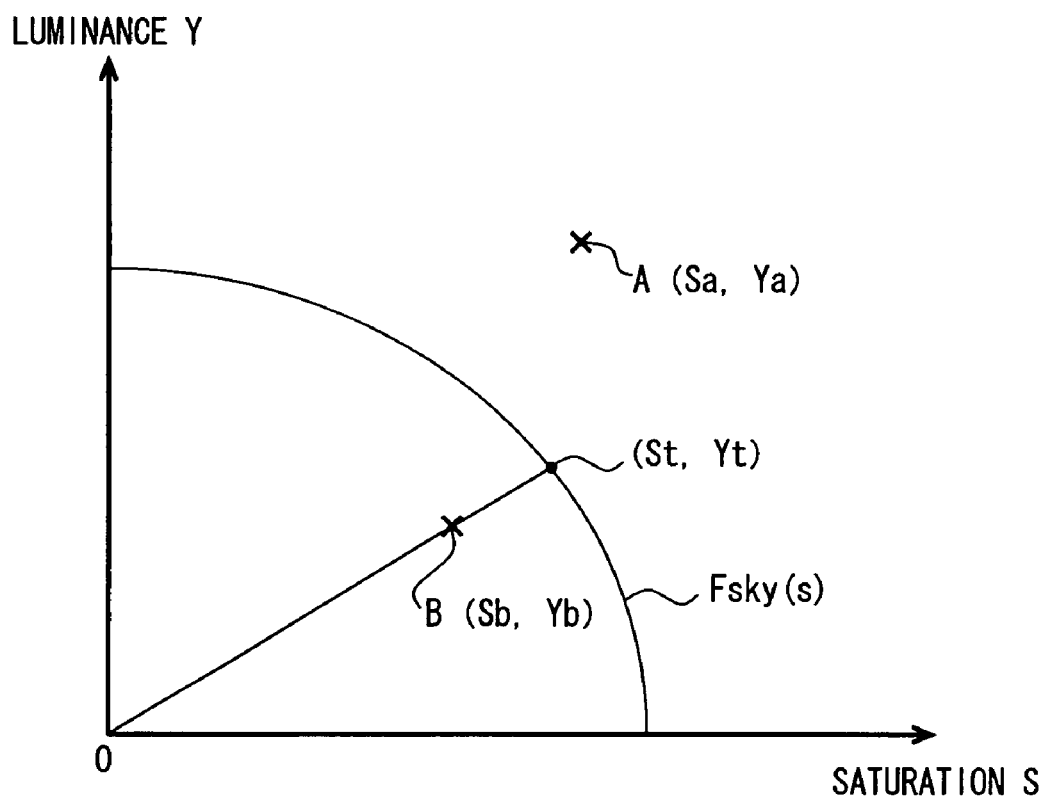
FIG. 8 illustrates a boundary function regarding the subject type "blue sky"

FIG. 8 illustrates a boundary function, which is represented by boundary function data regarding the subject type "blue sky", in the form of a graph in which luminance Y and saturation S are plotted along the vertical and horizontal axes, respectively. A boundary function Fsky(s) regarding the subject type "blue sky" has been found experimentally with regard to the subject type "blue sky".

By way of example, assume that a plotted point in accordance with saturation S and luminance Y obtained from the input feature value (Rave, Gave, Bave) is the position of a point A (Sa,Ya) in the function graph illustrated in FIG. 8. The point A (Sa,Ya) is situated in an outer area defined by the boundary function Fsky(S). In this case, the subject type "blue sky" has sufficient brightness even if not corrected. With regard to the subject type "blue sky", therefore, it is judged that there is no particular need to execute correction processing. That is, it is construed that the target feature value is equal to the input feature value. Gain Gsky regarding the subject type "blue sky" becomes "1" ("NO" at step 38).

Assume that a plotted point in accordance with saturation S and luminance Y obtained from the input feature value (Rave, Gave, Bave) is the position of a point B (Sa,Ya) in the function graph illustrated in FIG. 8. The point B (Sb,Yb) is situated in an inner area defined by the boundary function Fsky(S). In this case, the input image containing the subject type "blue sky" will appear dark if the input feature value (Rave, Gave, Bave) is used as the target feature value as is (i.e., gain Gsky=1). In this case, the intersection (St,Yt) between the boundary function Fsky(S) and a straight line connecting the origin (0,0) and the plotted point B (Sb,Yb) obtained from the input feature value (Rave, Gave, Bave) is found. The gain Gsky regarding the subject type "blue sky" is found according to the following equation ("YES" at step 38; step 39):

$$Gsky = St/Sb \qquad \text{Equation 5}$$

Thus, gain Gsky regarding the subject type "blue sky" is calculated using the boundary function Fsky(s). It can be said that the boundary function Fsky(s) represents a condition stipulating whether or not a correction should be applied to the subject type "blue sky". Further, if the correction should be performed, it can be said that the function is one that stipulates the correction value (gain).

With regard to the subject type "blue sky", the gain Gsky obtained according to Equation 5 is adopted as the common gain regarding each of R, G, B. The target feature value regarding the subject type "blue sky" is (Gsky·Rave, Gsky·Gave, Gsky·Bave).

The target feature value may be determined in advance on a per-subject-type basis as a matter of course. In this case, a correction value (gain) is calculated using the predetermined target feature value and the calculated input feature value.

Figure 9:
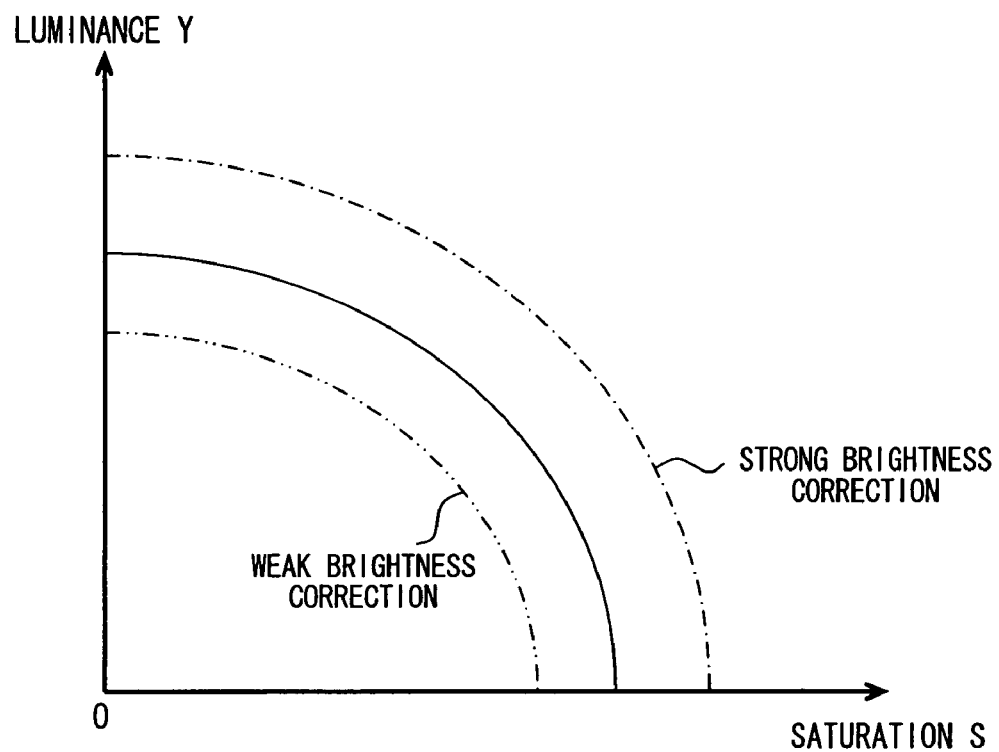
FIG. 9 illustrates a boundary function regarding the subject type "blue sky"

The boundary function (target feature value) mentioned above can be changed by a parameter that is input using the input unit 2. FIG. 9 illustrates the manner in which the boundary function Fsky(S) regarding the subject type "blue sky" is changed.

In a case (strong brightness correction) where it is desired to correct the subject type "blue sky" by making it brighter, a data input indicating "intensify brightness of subject type 'blue sky'" is made using the input unit 2. For example, the degree of the brightness correction is input by using a mouse or the like to slide a slide bar displayed on the display screen of the display unit 3.

If the operator makes the above-described input to brighten the subject type "blue sky", the boundary function Fsky regarding "blue sky" stored in the boundary function table 23 is changed to the function indicated by the one-dot chain line shown in FIG. 9. If the saturation S and luminance Y obtained from the input feature value are situated on the inner side of the boundary line indicated by the one-dot phantom line, then a gain Gsky (>1) that will correct this plotted point to lie on the boundary function indicated by the one-dot chain line is calculated. Conversely, if the operator attempts to make the subject type "blue sky" darker than the standard, the input unit 2 is used to make an input indicating "weaken brightness of subject type 'blue sky'". The boundary function Fsky is changed to the function indicated by the two-dot phantom line.

Figure 10:
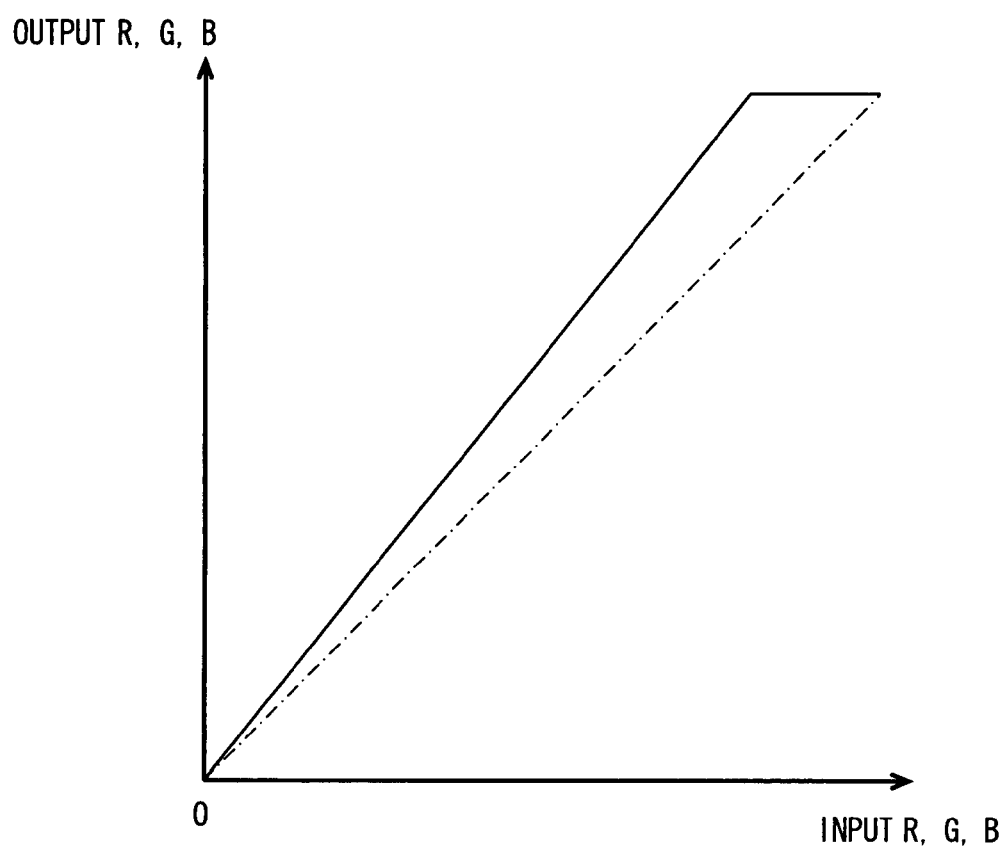
FIG. 10 illustrates a correction function.

FIG. 10 illustrates a correction function (a straight gain line) to which gain Gsky has been applied. In FIG. 10, the phantom line indicates a correction function for when gain is "1", and the solid line indicates a correction function to which gain Gsky (>1) has been applied.

With regard to the subject type "blue sky", the photographic scene is one that is shot outdoors. Accordingly, gain Gsky that is common with regard to each of R, G, B is found without taking white balance into consideration. With regard to another feature type, e.g., the feature type "face", it may be so arranged that gain (the target feature value) is calculated separately with regard to each of R, G, B taking white balance into consideration (the ratio among R, G, B is assumed to be a prescribed ratio). In any case, gain (Gri, Ggi, Gbi) for correcting the input feature value regarding each of R, G, B (where i signifies each detected subject type) is calculated with regard to each of the subject types detected.

The color-conversion-condition synthesizing circuit 14 will be described next.

The color-conversion-condition synthesizing circuit 14 is a circuit that uses the subject type-by-type gain (Gri, Ggi, Gbi) supplied from the subject type-by-type target feature-value/color-conversion-condition calculating circuit 13 and the subject type-by-type degree Wi of importance entered from the input unit 2 to calculate a new gain ("applicable gain") such that the input feature values regarding each subject type will approach overall the target feature values regarding each subject type.

The color-conversion-condition synthesizing circuit 14 calculates applicable gain (Gr, Gg, Gb) according to the following equations based upon subject type-by-type gains (Gri, Ggi, Gbi) supplied from the subject type-by-type target feature-value/color-conversion-condition calculating circuit 13 and the subject type-by-type degree Wi of importance entered by the operator from the input unit 2:

$$Gr = \Sigma(Wi \cdot Gri)/\Sigma Wi$$

$$Gg = \Sigma(Wi \cdot Ggi)/\Sigma Wi \qquad \text{Equation 6}$$

$$Gb = \Sigma(Wi \cdot Gbi)/\Sigma Wi$$

Figure 11A:
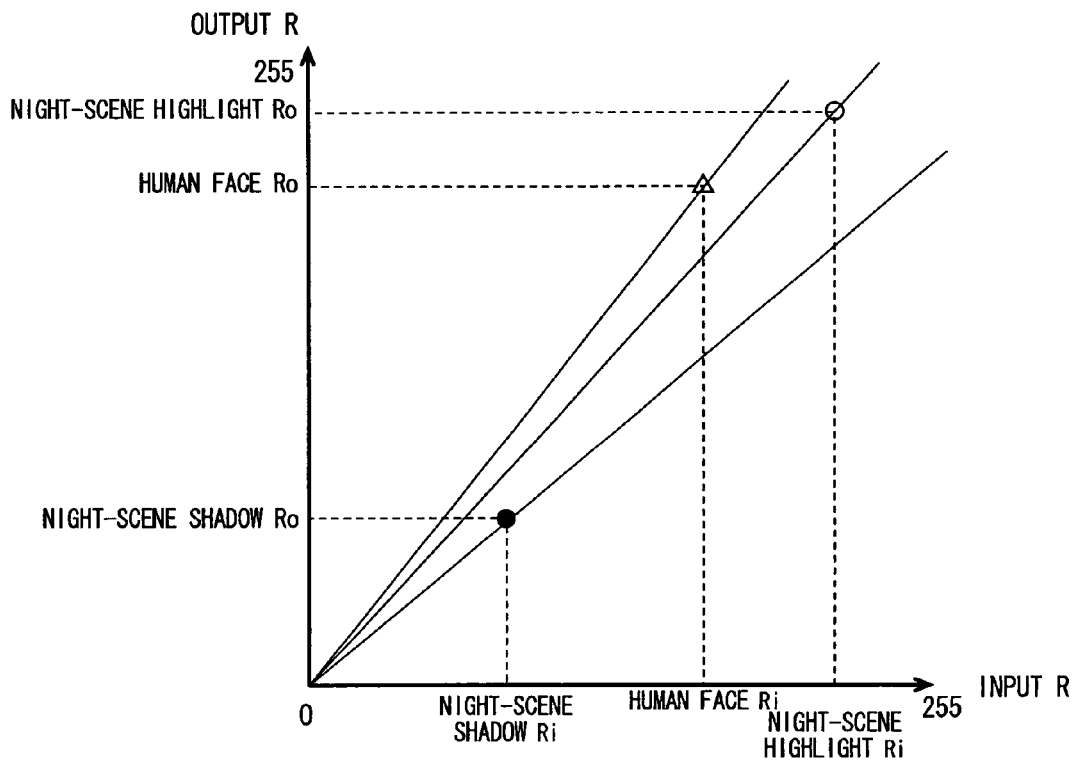
FIG. 11a illustrates correction functions regarding the feature type "night scene" (shadow), the feature type "night scene" (highlight) and the feature type "face"

Applicable gain calculated by the color-conversion-condition synthesizing circuit 14 will be described using a graph. FIG. 11*a* is a graph illustrating input-output relationships (gain functions) for the R component with regard to an input image that contains the feature type "night scene" and the feature type "face". These input-output functions are represented by gains for the R component regarding respective ones of the feature types "night scene" and "face" calculated in the subject type-by-type target feature-value/color-conversion-condition calculating circuit 13. It should be noted that with regard to the subject type "night scene", an input feature value and a target feature value are obtained with regard to each of shadow and highlight (see FIG. 7). In the graph illustrated in FIG. 11*a*, the input feature value and target feature value regarding the subject type "night scene" (shadow) are indicated by the black circle, and the input feature value and target feature value regarding the subject type "night scene" (highlight) are indicated by the white circle. The input feature value and target feature value regarding the subject type "face" is indicated by the triangle.

Figure 11B:
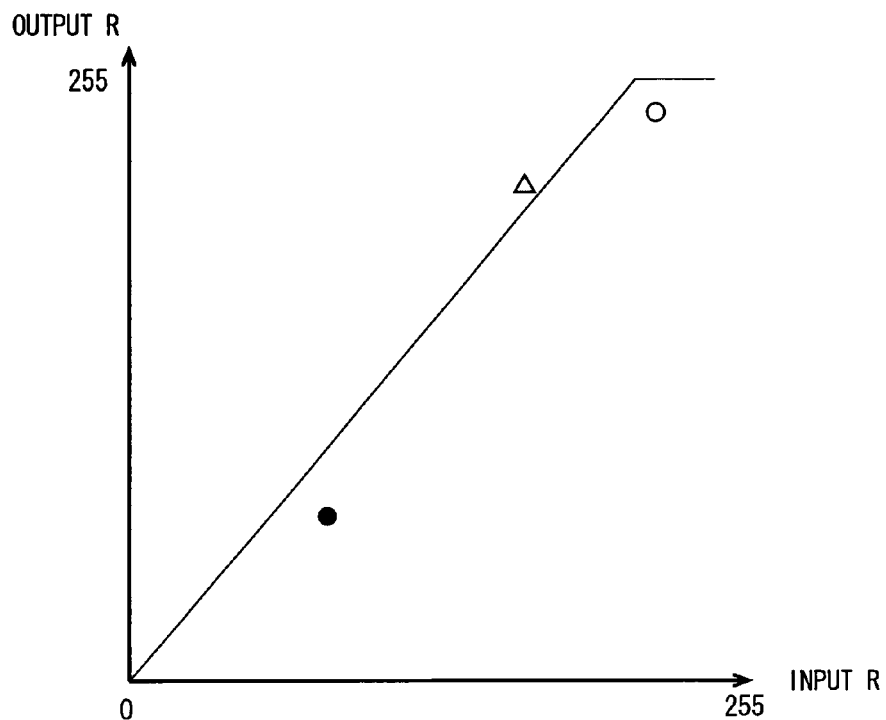
FIG. 11b illustrates a correction function decided by applicable gain.

An input-output relationship (gain function) decided by applicable gain Gr regarding the R component obtained by applying Equation 6 indicated above is illustrated in FIG. 11*b*. The result of taking the weighted average of the gain (Gri, Ggi, Gbi), which is obtained for every subject type, by applying Equation 6 is adopted as applicable gain (Gr, Gg, Gb) to be applied to the input image data. Applicable gain (Gr, Gg, Gb) whereby each input feature value regarding each detected subject type will approach overall each corresponding target feature value is obtained. Further, since the weighted average conforms to the degree Wi of importance that is input by the operator, the applicable gain more strongly reflects the gain regarding the subject type that the operator emphasizes.

The applicable gain (Gr, Gg, Gb) that is calculated by the color-conversion-condition synthesizing circuit 14 is applied to the image correcting circuit 15. Using the applicable gain (Gr, Gg, Gb), the image correcting circuit 15 corrects the RGB values of every pixel constituting the image represented by the image data that has been read from the storage unit 4. The corrected image data is output from the image processing apparatus 1 and applied to the display unit 3 or printer 5.

First Modification

It may be so arranged that in addition to the processing according to the embodiment described above, a user's request is accepted using the input unit 2 and display unit 3 and detection accuracy and target feature value (gain) for each subject type are modified. FIG. 12 illustrates an example of a screen, which is for inputting a user's wish, displayed on the display screen of the display unit 3.

The input unit 2 is used to select any one of "PRINT—EMPHASIZE PRODUCTIVITY", "PRINT—EMPHASIZE QUALITY", "PHOTOGRAPH—EMPHASIZE PRODUCTIVITY" and "PHOTOGRAPH—EMPHASIZE QUALITY". Processing in the image processing apparatus 1 changes in line with the user's selection (wish).

If the user selects "PRINT—EMPHASIZE QUALITY" or "PHOTOGRAPH—EMPHASIZE QUALITY", processing in the image processing apparatus 1 is executed in such a manner that it is possible to obtain a correction result having a higher quality in comparison with a case where "PRINT—EMPHASIZE PRODUCTIVITY" or "PHOTOGRAPH—EMPHASIZE PRODUCTIVITY" is selected. For example, even in a case where area ratio (see step 34 in FIG. 4), which is used in determining whether the subject type "face" is contained in the input image, is revised to a small value and, as a result, a face image having a smaller area is contained in the input image, it is determined that the input image contains the subject type "face". That is, detection can be performed down to smaller-size faces. Conversely, if "PRINT—EMPHASIZE PRODUCTIVITY" or "PHOTOGRAPH—EMPHASIZE PRODUCTIVITY" is selected, processing that emphasizes processing speed is executed in the image processing apparatus 1.

Further, if the user selectes "PHOTOGRAPH—EMPHASIZE PRODUCTIVITY" or "PHOTOGRAPH—EMPHASIZE QUALITY", gain is adjusted in such a manner that the slope of the gain function (see FIG. 11b) is enlarged in comparison with a case where "PRINT—EMPHASIZE PRODUCTIVITY" or "PRINT—EMPHASIZE QUALITY" is selected.

Second Modification

Figure 13:
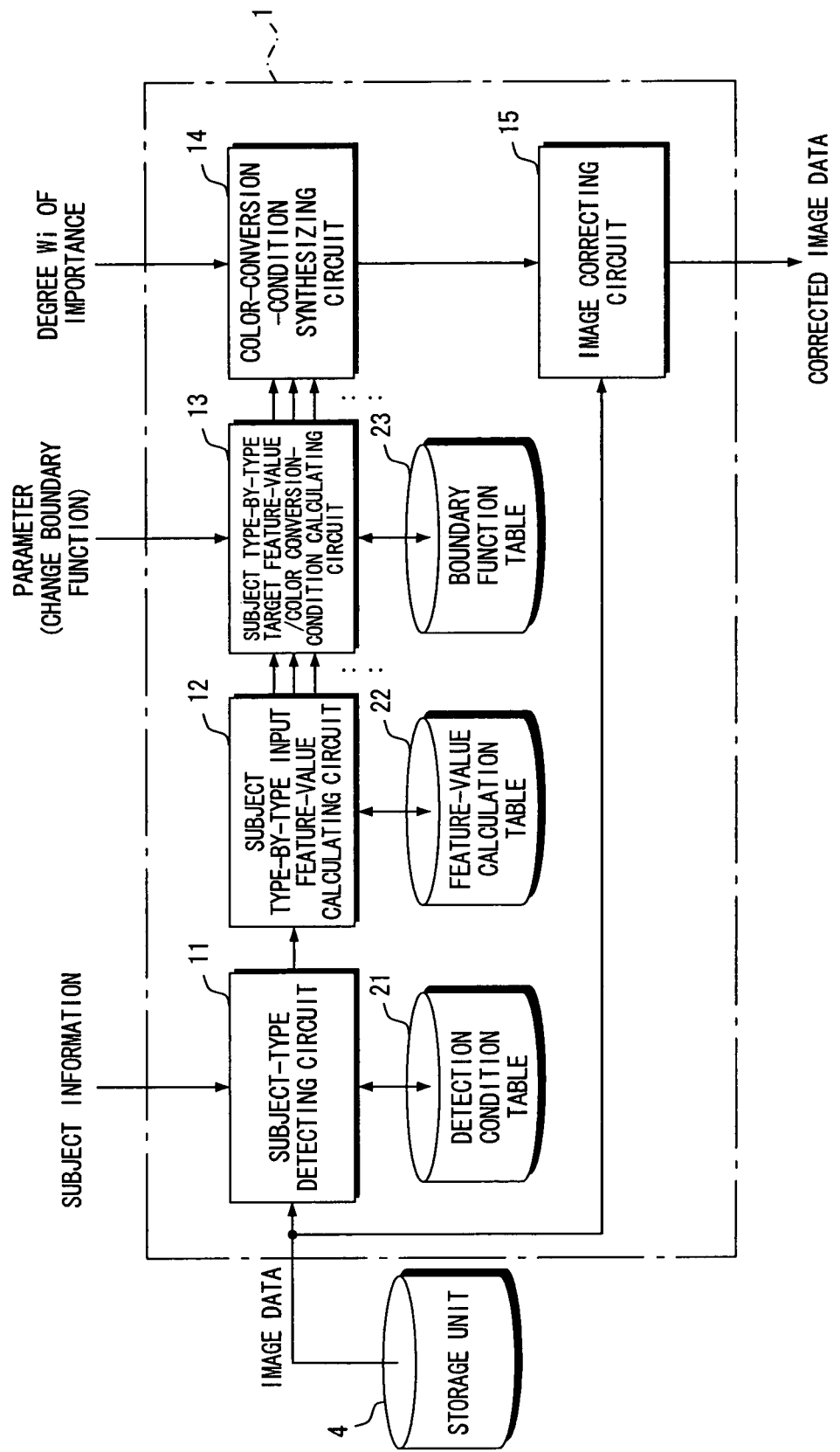
FIG. 13 is a block diagram illustrating the electrical structure of an image correction apparatus according to a modification of the first embodiment.

FIG. 13, which shows another modification (second modification) of the first embodiment, is a block diagram illustrating the electrical structure of the image processing apparatus 1 corresponding to FIG. 2, described above, as well as the storage unit 4.

In the second modification, subject information is input from the input unit 2 and applied to the subject-type detecting circuit 11. The subject information that is input from the input unit 2 is, e.g., information relating to whether or not each subject type exists in the input image and data representing the position, etc., at which a subject type exists in the input image.

By way of example, assume that it is known beforehand (that the operator of the image processing system has ascertained) that the subject type "face" does not exist in an input image to be subjected to image processing. In this case, there is no need for processing for detecting the subject type "face" in the subject-type detecting circuit 11, processing for calculating an input feature value regarding the subject type "face" in the subject type-by-type input feature-value calculating circuit 12, and processing for calculating a target feature value and gain regarding the subject type "face" in the subject type-by-type target feature-value/color-conversion-condition calculating circuit 13. If the subject-type information supplied from the input unit 2 to the subject-type detecting circuit 11 contains data indicative of the fact that the subject type "face" does not exist, then the subject-type detecting circuit 11 does not execute detection processing regarding the subject type "face", and processing regarding the subject type "face" also is not executed in the subject type-by-type input feature-value calculating circuit 12 and subject type-by-type target feature-value/color-conversion-condition calculating circuit 13. As a result, the processing speed of the image processing apparatus 1 can be raised and so can the accuracy of applicable gain finally obtained.

In a case where it is known beforehand that the subject type "face", for example, exists in an input image to be subjected to image processing, the area in which the subject type "face" exists in the input image [the position (area) of the face in the input image] may be incorporated in the subject information that is input from the input unit 2. In this case also the subject-type detecting circuit 11 does not execute detection processing regarding the subject type "face". Further, the subject type-by-type input feature value calculating circuit 12 extracts pixels, which are contained in the area (designated area) of existence of the subject type "face" supplied from the input unit 2, from the input image as pixels (face pixels) regarding the subject type "face" (the processing of step 32 in FIG. 4 is skipped).

In a case where input image data contains tag information and the tag information contains information relating to the absence or presence of a subject type (absence or presence of the subject type "face"), it may be so arranged that the image processing apparatus 1 is controlled based upon the tag information instead of the subject information that enters from the input unit 2.

Second Embodiment

Figure 14:
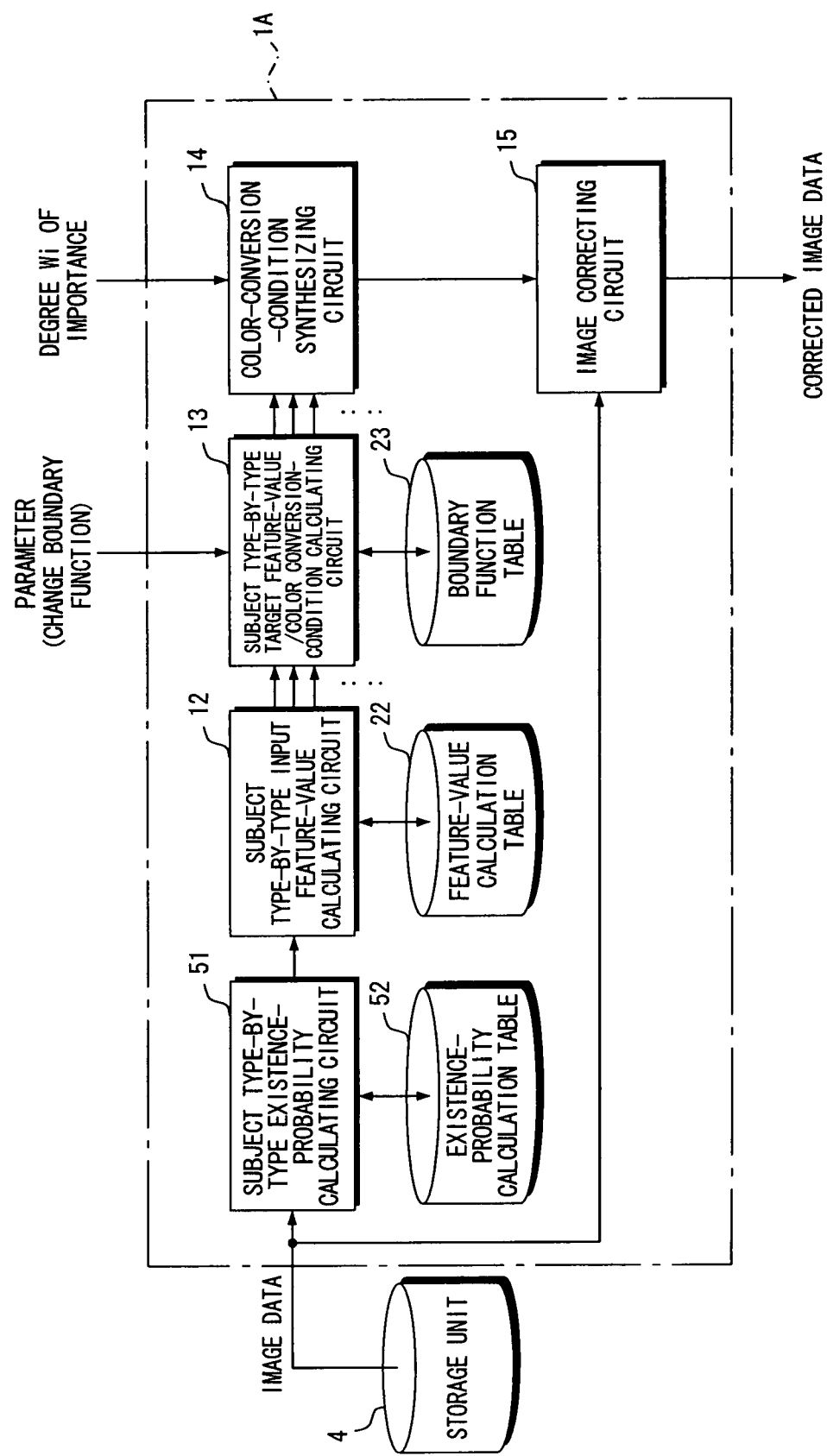
FIG. 14 is a block diagram illustrating the electrical structure of an image correction apparatus according to a second embodiment.

FIG. 14 is a block diagram illustrating the electrical structure of an image processing apparatus 1A according to a second embodiment, as well as the storage unit 4. This apparatus differs from the image processing apparatus 1 of the first embodiment (FIG. 2) in that a subject type-by-type existence-probability calculating circuit 51 is provided instead of the subject-type detecting circuit 11. It also differs from the image processing apparatus 1 of the first embodiment in that an existence-probability calculation table 52 is provided instead of the detection condition table 21.

Figure 15:
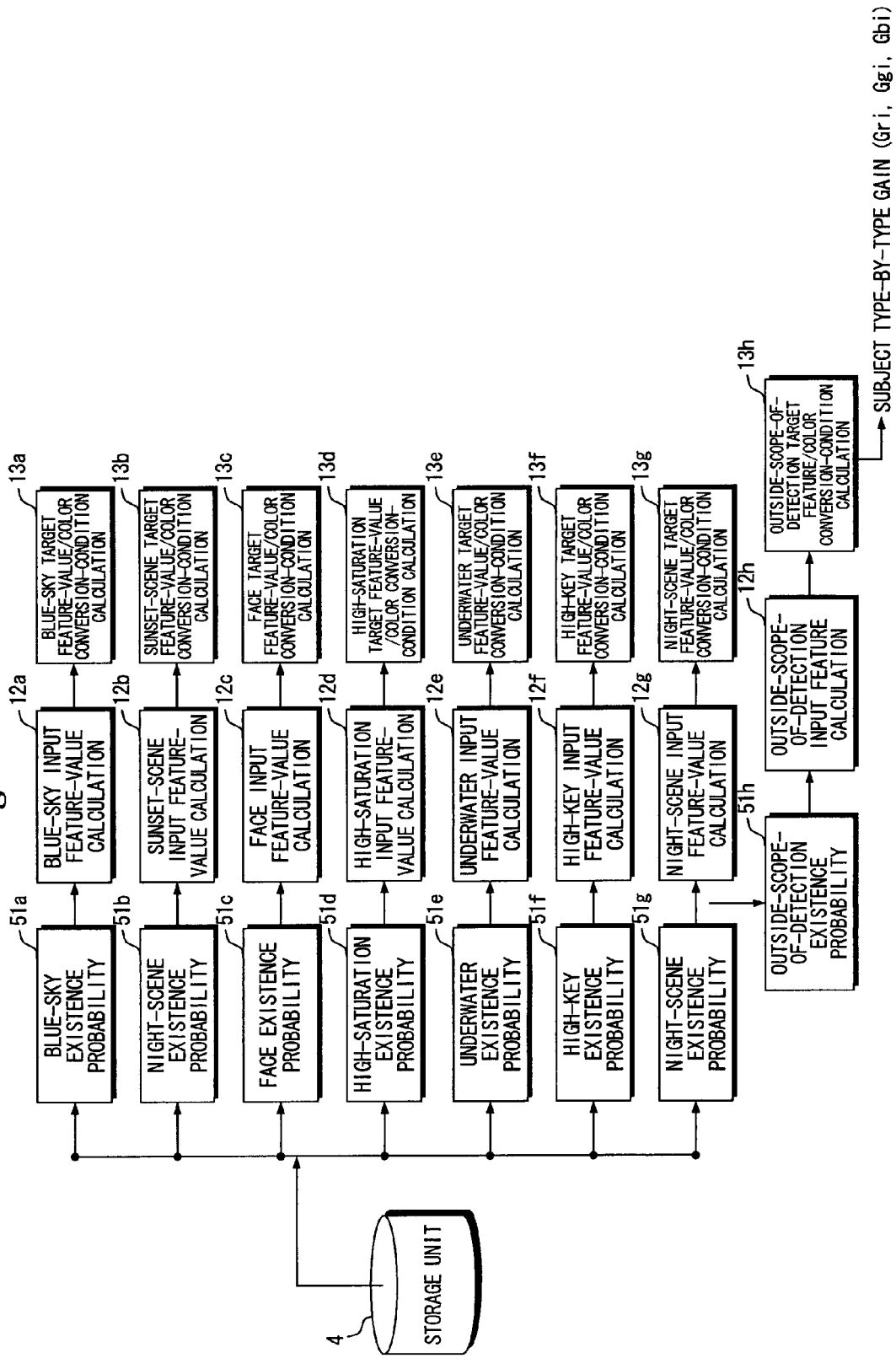
FIG. 15 is a functional block diagram illustrating the functions of a subject type-by-type existence-probability calculating circuit, a subject type-by-type input feature calculating circuit and a subject type-by-type target feature calculating circuit/color-conversion-condition calculating circuit.

FIG. 15 is a functional block diagram illustrating the functions of the subject type-by-type existence-probability calculating circuit 51, subject type-by-type input feature-value calculating circuit 12 and subject type-by-type target feature-value calculating circuit/color-conversion-condition calculating circuit 13.

The subject type-by-type existence-probability calculating circuit 51 is a circuit for calculating, for every predetermined subject type, the probability of existence in the input image (probability, degree of confidence or degree of certainty with which it is estimated that the subject type exists).

The subject type-by-type existence-probability calculating circuit 51 calculates whether the seven subject types "blue sky", "sunset scene", "face", "high saturation", "underwater", "high key" and "night scene" are contained in the input image and, if a subject type is contained in the input image, calculates to what degree of probability (confidence, certainty) the subject type is contained (function blocks 51a to 51g in FIG. 15). Furthermore, if the input image does not contain any of the seven subject types mentioned above (this will be referred to as the subject type "outside scope of detection" below), the subject type-by-type existence-probability calculating circuit 51 also calculates the probability (confidence, certainty) that this will be so. (function block 51h in FIG. 15).

FIG. 16 illustrates the content of the existence-probability calculation table 52 used in calculating existence probability in the subject type-by-type existence-probability calculating circuit 51.

Types of features to be used in calculation of existence probabiity and identification points have been stored in the existence-probability calculation table 52 in correspondence with respective ones of the seven subject types "blue sky", "sunset scene", "face", "high saturation", "underwater", "high key" and "night scene".

The data stored in the existence-probability calculation table 52 (the feature types and identification points to be used in calculation of existence probability) is obtained by learning processing.

Figure 17:
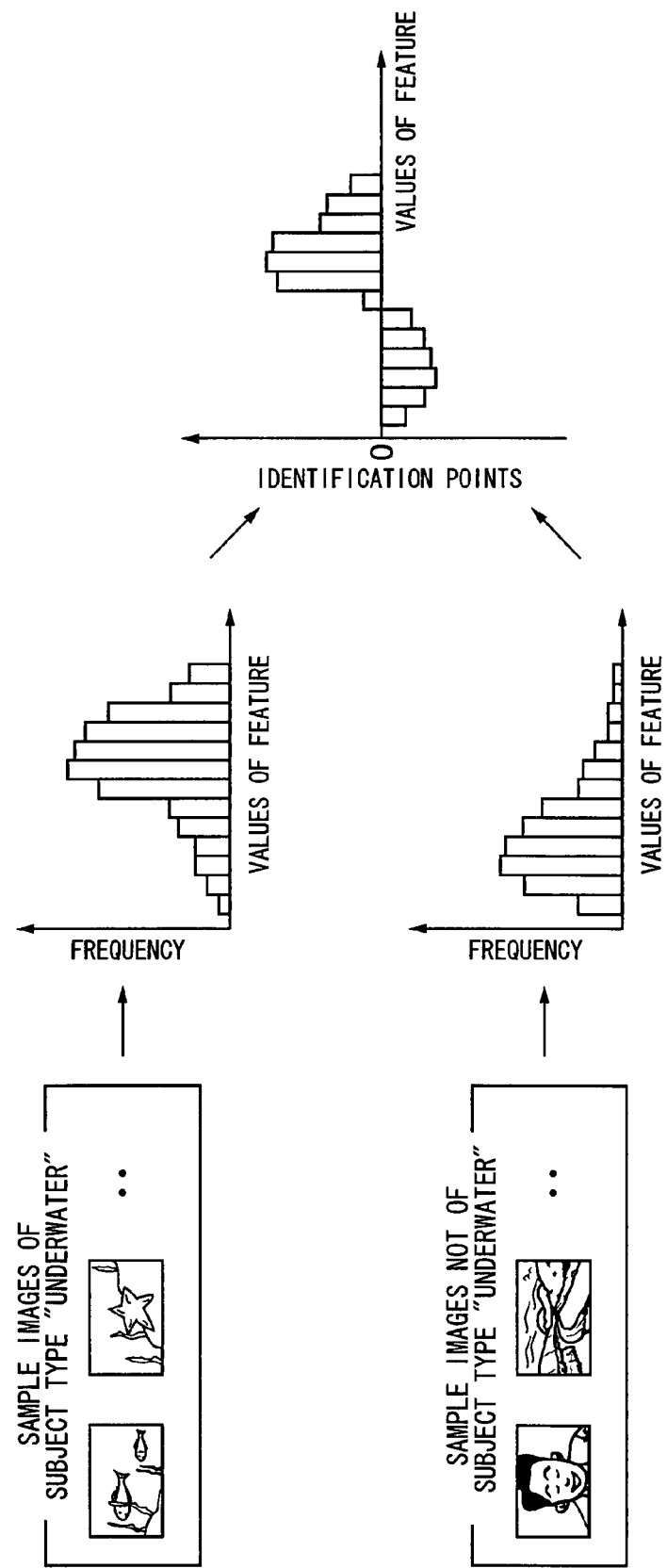
FIG. 17 illustrates the flow of creation of the existence-probability calculation table.

With reference to FIG. 17, in learning processing regarding the subject type "underwater", first a plurality of images that contain the subject type "underwater" (referred to as "underwater sample images") and a plurality of images that do not contain the subject type "underwater" (referred to as "non-underwater images") are prepared (see the left side of FIG. 17). Then, one feature value type, e.g., R-value average, is selected, the selected feature value type (R-value average) is calculated using the plurality of underwater sample images, and a frequency histogram thereof is created. Similarly, the selected feature value type (R-value average) is calculated using the plurality of non-underwater sample images and a frequency histogram thereof is calculated (see the center of FIG. 17).

If there is a frequency-histogram offset conforming to the values of a feature between the frequency histogram created using the plurality of underwater sample images and the frequency histogram created using the plurality of non-underwater sample images, then it can be construed that the selected feature value type is a feature value type suitable for distinguishing between an underwater sample image and a non-underwater sample image. Logarithmic values of ratios of corresponding feature-value-to-feature-value frequency values of the two created histograms are calculated. The calculated logarithmic values are "identification points" (see the right side of FIG. 17).

With regard to the input image data, the subject type-by-type existence-probability calculating circuit 51 calculates the feature values regarding the feature value types that have been stored in the existence-probability calculation table 52 and acquires the identification points corresponding to the feature values calculated. If an acquired identification point is a positive identification point, then there is a good possibility that the input image is an underwater image, and it can be said that the greater the absolute value of this value, the greater the possibility. Conversely, if the acquired identification point is a negative identification point, then there is a good possibility that the input image does not contain an underwater image, and it can be said that the greater the absolute value of this value, the greater the possibility.

Using the data that has been stored in the existence-probability calculation table 52, the subject type-by-type existence-probability calculating circuit 51 calculates existence probabilities (the above-mentioned identification points or values of 0 to 1 that are based on the identification points) regarding respective ones of the seven subject types "blue sky", "sunset scene", "face", "high saturation", "underwater", "high key" and "night scene". The existence probability of the subject type "outside scope of detection" is calculated according to the following equation:

$$Pot = 1 - MAX(1 - P_1, P_2, \ldots, P_7) \quad \text{Equation 7}$$

Here $P_1$, $P_2$, ..., $P_7$ represent existence probabilities regarding respective ones of the seven subject types "blue sky", "sunset scene", "face", "high saturation", "underwater", "high key" and "night scene", and $MAX(1-P_1, P_2, \ldots, P_7)$ represents the maximum value among $P_1, P_2, \ldots, P_7$.

The existence probabilities regarding the seven subject types "blue sky", "sunset scene", "face", "high saturation", "underwater", "high key" and "night scene" and the existence probability regarding the subject type "outside scope of detection", which probabilities have been calculated by the subject type-by-type existence-probability calculating circuit 51, are used in the above-described weighting processing (Equation 6).

That is, in the image processing apparatus 1A of the second embodiment, the following unified importance degree Wa is used instead of the importance degree Wi (see Equation 6) of the first embodiment:

$$Wa = Wi \cdot Wpi \quad \text{Equation (8)}$$

Here Wpi is a numerical value (degree of importance dependent upon existence probability) conforming to each existence probability pi, of every detected subject type, obtained by the subject type-by-type existence-probability calculating circuit 51. For example, the Wpi is calculated based upon a graph (conversion graph) illustrated in FIG. 18. In the image processing apparatus 1A of the second embodiment, the applicable gain (Gr, Gg, Gb) applied to correction of the input image data more strongly reflects the gain regarding the subject type that the operator emphasizes and more strongly reflects the gain regarding the subject type having a high probability of existing in the input image.

Figure 18:
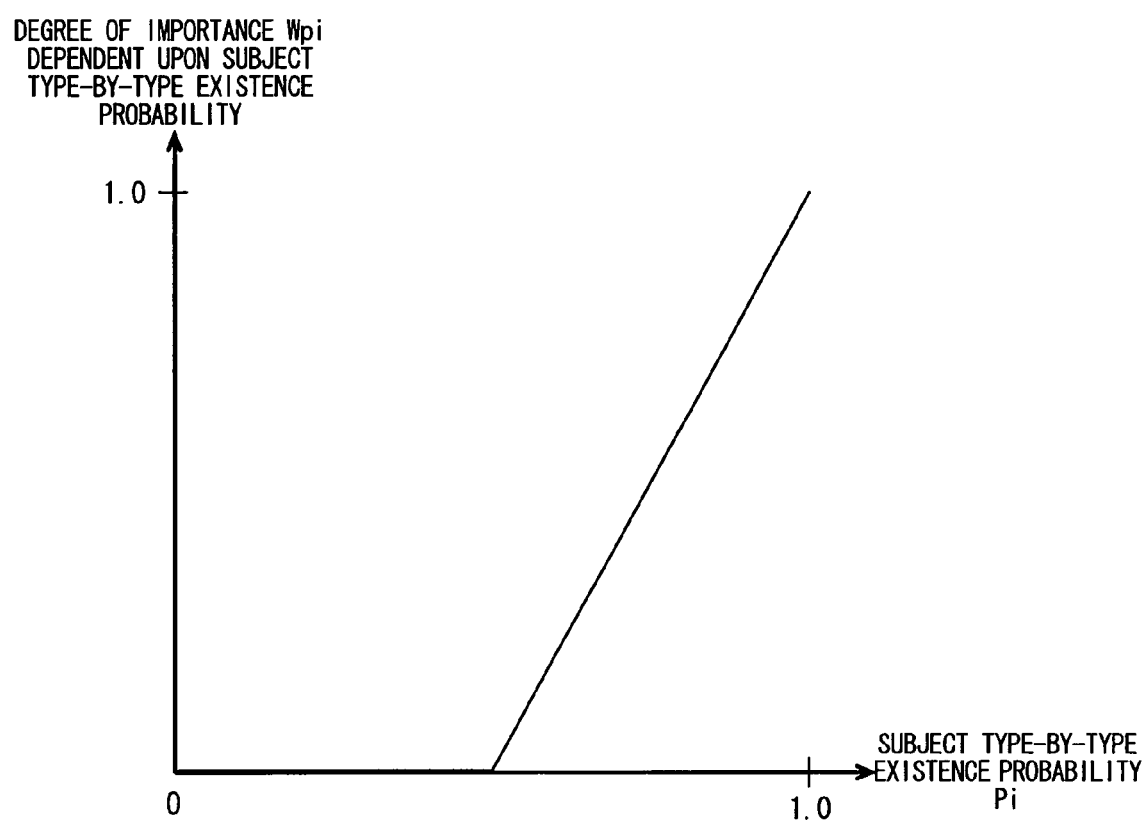
FIG. 18 is a graph illustrating the relationship between existence probability and degree of importance corresponding to existence probability.

Of course, the conversion graph illustrated in FIG. 18 may be made to differ for every subject type.

It may be so arranged that the above-mentioned unified importance degree Wa is found according to the following equation:

$$Wa = Wi \cdot Wpi \cdot Wsi \quad \text{Equation 9}$$

Here Wsi is a value (degree of importance dependent upon area) that is based upon the area of the input image occupied by each detected subject type. Gain regarding a subject type occupying a larger area in the input image is more strongly reflected in the applicable gain.

In the second embodiment as well, in a manner similar to that of the first modification of the first embodiment, it will suffice to change processing in the image processing apparatus 1 in line with the wish of the user relating to image correction. In a manner similar to that of the second modification of the first embodiment, it may be so arranged that the processing in the image processing apparatus 1A is supported based upon externally applied subject information (information, etc., relating to the absence or presence of each subject type in the input image).

Although the image processing apparatuses 1, 1A are implemented by hardware circuits in the first and second embodiments, it may be so arranged that a part or the entirety thereof is implemented by software.

What is claimed is:

1. An image correction apparatus comprising:
   importance input means for accepting inputs of first degrees of importance regarding respective ones of a predetermined plurality of subject types;
   subject-type detecting means for detecting, based upon image data applied thereto, which subject types among the predetermined plurality of subject types are contained in the image represented by this image data;
   input feature value calculating means for calculating, based upon the image data and with regard to respective ones of the subject types detected by said subject-type detecting means, input feature values by calculation processing decided for every subject type;
   correction value calculating means for calculating correction values regarding respective ones of the detected subject types based upon the input feature values calculated by said input feature value calculating means and target feature values that has been decided for every subject type;
   subject type-by-type existence-probability calculating means for calculating existence probabilities representing to what degrees of confidence respective ones of images representing the plurality of subject types are contained in the image represented by the image data, the calculation being performed for every subject type of the plurality thereof;
   applicable-correction-value calculating means for calculating an applicable correction value obtained by weighted averaging of the correction values regarding respective ones of the subject types, which correction values have been calculated by said correction value calculating means, using the first degrees of importance accepted with regard to respective ones of the subject types by said importance input means and second degrees of importance obtained in accordance with the existence probabilities of respective ones of the subject types calculated by said existence-probability calculating means;
   image correcting means for correcting the image data based upon the applicable correction value calculated by said applicable-correction-value calculating means; and
   an input means for inputting subject information indicating that a specific subject type among the predetermined plurality of subject types does not exist in the image represented by said image data,
   wherein the image correction apparatus skips at least the detecting by the subject-type detecting means, the calculating by the input feature value calculating means, the calculating by the correction value calculating means, and the calculating by the subject type-by-type existence-probability calculating means for the specific subject type.

2. The image correction apparatus according to claim 1, further comprising subject type-by-type area calculating means for calculating, for every detected subject type, the area that an image representing the subject type occupies in the image represented by the image data;
   wherein said applicable-correction-value calculating means weights and averages the correction values regarding respective ones of the subject types, which correction values have been calculated by said correction value calculating means, using the first degrees of importance and third degrees of importance obtained in accordance with the areas regarding respective ones of the subject types calculated by said area calculating means.

3. The image correction apparatus according to claim 1, further comprising:
   parameter input means for accepting input of a parameter that changes the target feature value; and
   target feature value modifying means for modifying the target feature value based upon the parameter input by said parameter input means.

4. An image correction method comprising:
   accepting inputs of first degrees of importance regarding respective ones of a predetermined plurality of subject types;
   detecting, based upon applied image data, which subject types among a predetermined plurality of subject types are contained in the image represented by this image data;
   calculating, based upon the image data and with regard to respective ones of the detected subject types, input feature values by calculation processing decided for every subject type;
   calculating correction values regarding respective ones of the detected subject types based upon the calculated input feature value and target feature values that has been decided for every subject type;
   calculating subject type-by-type existence-probability value representing to what degrees of confidence respective ones of images representing the plurality of subject types are contained in the image represented by the image data, the calculation being performed for every subject type of the plurality thereof;
   calculating an applicable correction value obtained by weighted averaging of the calculated correction values regarding respective ones of the subject types using the first degrees of importance accepted with regard to respective ones of the subject types and second degrees of importance obtained in accordance with the existence probabilities of respective ones of the subject types calculated by said existence-probability calculation;
   correcting the image data based upon the applicable correction value calculated;
   inputting subject information indicating that a specific subject type among the predetermined plurality of subject types does not exist in the image represented by said image data; and
   skipping at least the detecting the subject-type, the calculating the input feature value, the calculating the correction value, and the calculating the subject type-by-type existence-probability for the specific subject type.

5. A non-transitory computer readable medium encoded with a program for causing a computer to execute the following processing:
   importance input processing for accepting inputs of first degrees of importance regarding respective ones of a predetermined plurality of subject types;
   subject-type detection processing for detecting, based upon image data applied thereto, which subject types among the predetermined plurality of subject types are contained in the image represented by this image data;
   input feature value calculation processing for calculating, based upon the image data and with regard to respective ones of the detected subject types, input feature values by calculation processing decided for every subject type;
   correction value calculation processing for calculating correction values regarding respective ones of the detected subject types based upon the detected input feature values and target feature values that has been decided for every subject type;

calculating subject by subject existence probabilities representing to what degrees of confidence respective ones of images representing the plurality of subject types are contained in the image represented by the image data, the calculation being performed for every subject type of the plurality thereof;

applicable-correction-value calculation processing for calculating an applicable correction value obtained by weighted averaging of the calculated correction values regarding respective ones of the subject types, using the first degrees of importance accepted with regard to respective ones of the subject types by said importance input processing and second degrees of importance obtained in accordance with the existence probabilities of respective ones of the subject types calculated by said existence-probability calculation;

image correction processing for correcting the image data based upon the applicable correction value calculated; and input processing for inputting subject information indicating that a specific subject type among the predetermined plurality of subject types does not exist in the image represented by said image data, wherein the program skips at least the subject-type detection processing, the input feature value calculation processing, the correction value calculation processing, and the subject type-by-type existence-probability calculation processing for the specific subject type.

6. An image correction apparatus comprising:

importance input means for accepting inputs of first degrees of importance regarding respective ones of a predetermined plurality of subject types;

subject-type detecting means for detecting, based upon image data applied thereto, which subject types among the predetermined plurality of subject types are contained in the image represented by this image data;

input feature value calculating means for calculating, based upon the image data and with regard to respective ones of the subject types detected by said subject-type detecting means, input feature value by calculation processing decided for every subject type;

condition judging means for judging whether the input feature value of every subject type calculated by said input feature value calculating means satisfies a prescribed condition that has been decided for every subject type;

correction value calculating means for calculating a correction value with regard to a subject type for which the input feature value has been judged not to satisfy the prescribed condition by said condition judging means, the correction value being such that the input feature value regarding this subject type will come to satisfy the prescribed condition;

subject type-by-type existence-probability calculating means for calculating existence probabilities representing to what degrees of confidence respective ones of images representing the plurality of subject types are contained in the image represented by the image data, the calculation being performed for every subject type of the plurality thereof;

applicable-correction-value calculating means for calculating an applicable correction value obtained by weighted averaging of the correction values regarding respective ones of the subject types, which correction values have been calculated by said correction value calculating means, using the first degrees of importance accepted with regard to respective ones of the subject types by said importance input means and second degrees of importance obtained in accordance with the existence probabilities of respective ones of the subject types calculated by said existence-probability calculating means;

image correcting means for correcting the image data based upon the applicable correction value calculated by said applicable-correction-value calculating means; and an input means for inputting subject information indicating that a specific subject type among the predetermined plurality of subject types does not exist in the image represented by said image data, wherein the image correction apparatus skips at least the detecting by the subject-type detecting means, the calculating by the input feature value calculating means, the calculating by the correction value calculating means, and the calculating by the subject type-by-type existence-probability calculating means for the specific subject type.

7. An image correction method comprising:

accepting inputs of first degrees of importance regarding respective ones of a predetermined plurality of subject types;

detecting, based upon applied image data, which subject types among a predetermined plurality of subject types are contained in the image represented by this image data;

calculating, based upon the image data and with regard to respective ones of the detected subject types, input feature values by calculation processing decided for every subject type;

judging whether the input feature value of every calculated subject type satisfies a prescribed condition that has been decided for every subject type;

calculating a correction value with regard to a subject type for which the input feature value has been judged not to satisfy the prescribed condition, the correction value being such that the input feature value regarding this subject type will come to satisfy the prescribed condition;

calculating subject by subject existence probabilities representing to what degrees of confidence respective ones of images representing the plurality of subject types are contained in the image represented by the image data, the calculation being performed for every subject type of the plurality thereof;

calculating an applicable correction value obtained by weighted averaging of the calculated correction values regarding respective ones of the subject types using the first degrees of importance accepted with regard to respective ones of the subject types and second degrees of importance obtained in accordance with the existence probabilities of respective ones of the subject types calculated by said existence-probability calculation;

correcting the image data based upon the applicable correction value calculated;

inputting subject information indicating that a specific subject type among the predetermined plurality of subject types does not exist in the image represented by said image data; and skipping at least the detecting the subject-type, the calculating the input feature value, the calculating the correction value, and the calculating the subject type-by-type existence-probability for the specific subject type.

8. A non-transitory computer readable medium encoded with a program for causing a computer to execute the following processing:

importance input processing for accepting inputs of first degrees of importance regarding respective ones of a predetermined plurality of subject types;

subject-type detection processing for detecting, based upon image data applied thereto, which subject types among the predetermined plurality of subject types are contained in the image represented by this image data;

input feature value calculation processing for calculating, based upon the image data and with regard to respective ones of the detected subject types, input feature values by calculation processing decided for every subject type;

condition judgment processing for judging whether the input feature value of every subject type calculated by said input feature value calculation processing satisfies a prescribed condition that has been decided for every subject type;

correction value calculation processing for calculating a correction value with regard to a subject type for which the input feature value has been judged not to satisfy the prescribed condition by said condition judgment processing, the correction value being such that the input feature value regarding this subject type will come to satisfy the prescribed condition;

calculating subject by subject existence probabilities representing to what degrees of confidence respective ones of images representing the plurality of subject types are contained in the image represented by the image data, the calculation being performed for every subject type of the plurality thereof;

applicable-correction-value calculation processing for calculating an applicable correction value obtained by weighted averaging of the correction values regarding respective ones of the subject types, which correction values have been calculated by said correction value calculation processing, using the first degrees of importance accepted with regard to respective ones of the subject types by said importance input processing and second degrees of importance obtained in accordance with the existence probabilities of respective ones of the subject types calculated by said existence-probability calculation;

image correction processing for correcting the image data based upon the applicable correction value calculated by said applicable-correction-value calculation processing; and input processing for inputting subject information indicating that a specific subject type among the predetermined plurality of subject types does not exist in the image represented by said image data, wherein the program skips at least the subject-type detection processing, the input feature value calculation processing, the correction value calculation processing, and the subject type-by-type existence-probability calculation processing for the specific subject type.

9. An image correction apparatus comprising:

importance input device for accepting inputs of first degrees of importance regarding respective ones of a predetermined plurality of subject types;

subject-type detecting device for detecting, based upon image data applied thereto, which subject types among the predetermined plurality of subject types are contained in the image represented by this image data;

input feature value calculating device for calculating, based upon the image data and with regard to respective ones of the subject types detected by said subject-type detecting device, input feature values by calculation processing decided for every subject type;

correction value calculating device for calculating correction values regarding respective ones of the detected subject types based upon the input feature values calculated by said input feature value calculating device and target feature values that has been decided for every subject type;

subject type-by-type existence-probability calculating device for calculating existence probabilities representing to what degrees of confidence respective ones of images representing the plurality of subject types are contained in the image represented by the image data, the calculation being performed for every subject type of the plurality thereof;

applicable-correction-value calculating device for calculating an applicable correction value obtained by weighted averaging of the correction values regarding respective ones of the subject types, which correction values have been calculated by said correction value calculating device, using the first degrees of importance accepted with regard to respective ones of the subject types by said importance input device and second degrees of importance obtained in accordance with the existence probabilities of respective ones of the subject types calculated by said existence-probability calculating device;

image correcting device for correcting the image data based upon the applicable correction value calculated by said applicable-correction-value calculating device; and an input device for inputting subject information indicating that a specific subject type among the predetermined plurality of subject types does not exist in the image represented by said image data, wherein the image correction apparatus skips at least the detecting by the subject-type detecting device, the calculating by the input feature value calculating device, the calculating by the correction value calculating device, and the calculating by the subject type-by-type existence-probability calculating device for the specific subject type.

10. An image correction apparatus comprising:

importance input device for accepting inputs of first degrees of importance regarding respective ones of a predetermined plurality of subject types;

subject-type detecting device for detecting, based upon image data applied thereto, which subject types among the predetermined plurality of subject types are contained in the image represented by this image data;

input feature value calculating device for calculating, based upon the image data and with regard to respective ones of the subject types detected by said subject-type detecting device, input feature value by calculation processing decided for every subject type;

condition judging device for judging whether the input feature value of every subject type calculated by said input feature value calculating device satisfies a prescribed condition that has been decided for every subject type;

correction value calculating device for calculating a correction value with regard to a subject type for which the input feature value has been judged not to satisfy the prescribed condition by said condition judging device, the correction value being such that the input feature value regarding this subject type will come to satisfy the prescribed condition;

subject type-by-type existence-probability calculating device for calculating existence probabilities representing to what degrees of confidence respective ones of images representing the plurality of subject types are contained in the image represented by the image data, the calculation being performed for every subject type of the plurality thereof;

applicable-correction-value calculating device for calculating an applicable correction value obtained by weighted averaging of the correction values regarding respective ones of the subject types, which correction values have been calculated by said correction value calculating device, using the first degrees of importance accepted with regard to respective ones of the subject types by said importance input device and second degrees of importance obtained in accordance with the existence probabilities of respective ones of the subject types calculated by said existence-probability calculating device;

image correcting device for correcting the image data based upon the applicable correction value calculated by said applicable-correction-value calculating device; and an input device for inputting subject information indicating that a specific subject type among the predetermined plurality of subject types does not exist in the image represented by said image data, wherein the image correction apparatus skips at least the detecting by the subject-type detecting device, the calculating by the input feature value calculating device, the calculating by the correction value calculating device, and the calculating by the subject type-by-type existence-probability calculating device for the specific subject type.

11. The apparatus of claim 1, wherein the importance input means accepts input supplied by a user to specify the user's perception of degree of importance.

* * * * *